United States Patent
Killoran, Jr.

(10) Patent No.: US 10,438,182 B2
(45) Date of Patent: *Oct. 8, 2019

(54) EMAIL-BASED E-COMMERCE

(71) Applicant: SWOOP IP HOLDINGS LLC, Wilmington, DE (US)

(72) Inventor: John P. Killoran, Jr., Albuquerque, NM (US)

(73) Assignee: SWOOP IP HOLDINGS LLC, Wilmington, DE (US)

(*) Notice: Subject to any disclaimer, the term of this patent is extended or adjusted under 35 U.S.C. 154(b) by 269 days.

This patent is subject to a terminal disclaimer.

(21) Appl. No.: 15/644,240

(22) Filed: Jul. 7, 2017

(65) Prior Publication Data

US 2017/0372283 A1    Dec. 28, 2017

Related U.S. Application Data

(63) Continuation of application No. 13/833,521, filed on Mar. 15, 2013, now Pat. No. 9,710,797.

(60) Provisional application No. 61/672,982, filed on Jul. 18, 2012.

(51) Int. Cl.
  *G06Q 20/12* (2012.01)
  *G06Q 30/02* (2012.01)

(52) U.S. Cl.
  CPC ......... *G06Q 20/12* (2013.01); *G06Q 30/0241* (2013.01); *G06Q 30/0253* (2013.01)

(58) Field of Classification Search
  CPC . G06Q 20/12; G06Q 30/0241; G06Q 30/0253
  See application file for complete search history.

(56) References Cited

U.S. PATENT DOCUMENTS

| | | |
|---|---|---|
| 5,426,781 A | 6/1995 | Kaplan et al. |
| 5,664,110 A | 9/1997 | Green et al. |
| 5,694,546 A | 12/1997 | Reisman |

(Continued)

FOREIGN PATENT DOCUMENTS

WO    2006/119342 A2    11/2006

OTHER PUBLICATIONS

Truxa, Ivo MIVA® Merchant: MmPGP Secure PGP Email Merchant Notification Module, http://mivo.truxoft.com/mm000.htm, Jan. 21, 2011, pp. 1-10 *Cited in parent application.

*Primary Examiner* — Luis A Brown
*Assistant Examiner* — Robert C Johnson
(74) *Attorney, Agent, or Firm* — Volpe and Koenig, P.C.

(57) ABSTRACT

An email payment gateway having electronic commerce (e-commerce) system may send advertisement emails to customers that are registered with the e-commerce system. The advertisement emails may include mailto hyperlinks. Each mailto hyperlink may be associated with a product that is being offered for sale, and each mailto hyperlink describes an email message that may be generated when that hyperlink is selected. When a mailto hyperlink is selected, the generated email message may include one or more parameters related to the product associated with the hyperlink, such as an identifier of the product. The generated email message may then be transmitted to the e-commerce system. The e-commerce system may receive the message and, based on the parameters in the received message, execute a transaction to purchase the identified product on behalf of the customer.

19 Claims, 22 Drawing Sheets

(56) References Cited

U.S. PATENT DOCUMENTS

| | | | |
|---|---|---|---|
| 5,706,442 A | 1/1998 | Anderson et al. | |
| 5,710,887 A | 1/1998 | Chelliah et al. | |
| 5,758,328 A | 5/1998 | Giovannoli | |
| 5,793,972 A | 8/1998 | Shane | |
| 5,794,206 A | 8/1998 | Wilkinson et al. | |
| 5,799,157 A | 8/1998 | Escallon | |
| 5,809,242 A | 9/1998 | Shaw et al. | |
| 5,825,881 A | 10/1998 | Colvin, Sr. | |
| 5,826,242 A | 10/1998 | Montulli | |
| 5,826,269 A | 10/1998 | Hussey | |
| 5,838,790 A | 11/1998 | McAuliffe et al. | |
| 5,848,397 A | 12/1998 | Marsh et al. | |
| 5,855,008 A | 12/1998 | Goldhaber et al. | |
| 5,860,068 A * | 1/1999 | Cook | G06Q 20/12 705/26.81 |
| 5,864,823 A | 1/1999 | Levitan | |
| 5,870,717 A | 2/1999 | Wiecha | |
| 5,884,309 A * | 3/1999 | Vanechanos, Jr. | G06Q 10/10 |
| 5,890,138 A | 3/1999 | Godin et al. | |
| 5,897,622 A | 4/1999 | Blinn et al. | |
| 5,899,980 A | 5/1999 | Wilf et al. | |
| 5,905,973 A | 5/1999 | Yonezawa et al. | |
| 5,963,915 A * | 10/1999 | Kirsch | G06Q 20/12 705/26.8 |
| 5,970,469 A | 10/1999 | Scroggie et al. | |
| 6,101,485 A * | 8/2000 | Fortenberry | G06Q 10/107 705/14.51 |
| 6,175,823 B1 * | 1/2001 | Van Dusen | G06Q 20/085 705/14.26 |
| 6,246,996 B1 | 6/2001 | Stein et al. | |
| 6,639,610 B1 * | 10/2003 | Sponheim | G06F 16/955 715/760 |
| 6,938,048 B1 | 8/2005 | Jilk et al. | |
| 6,954,737 B2 | 10/2005 | Kalantar et al. | |
| 6,993,559 B2 | 1/2006 | Jilk et al. | |
| 7,533,064 B1 | 5/2009 | Boesch | |
| 7,577,587 B2 | 8/2009 | Gee | |
| 7,912,910 B2 | 3/2011 | Banerjee et al. | |
| 8,156,012 B1 * | 4/2012 | Eisner | G06Q 10/087 705/26.81 |
| 2002/0010746 A1 | 1/2002 | Jilk et al. | |
| 2002/0013739 A1 * | 1/2002 | O'Donnell | G06Q 10/08 705/26.81 |
| 2002/0029200 A1 * | 3/2002 | Dulin | G06F 21/33 705/67 |
| 2002/0065828 A1 | 5/2002 | Goodspeed | |
| 2002/0103752 A1 | 8/2002 | Berger et al. | |
| 2002/0120581 A1 | 8/2002 | Schiavone et al. | |
| 2002/0178360 A1 | 11/2002 | Wenocur et al. | |
| 2003/0217107 A1 | 11/2003 | Parry | |
| 2004/0024655 A1 | 2/2004 | Estes | |
| 2005/0044003 A1 | 2/2005 | O'Keeffe et al. | |
| 2005/0251460 A1 | 11/2005 | Quigley | |
| 2006/0190350 A1 * | 8/2006 | Maas | G06Q 30/00 705/26.62 |
| 2007/0022007 A1 | 1/2007 | Lawe | |
| 2009/0254447 A1 | 10/2009 | Blades | |
| 2009/0276345 A1 | 11/2009 | Hughes | |
| 2010/0010886 A1 | 1/2010 | Flynn, Jr. | |
| 2010/0113072 A1 * | 5/2010 | Gibson | G06Q 20/045 455/466 |
| 2011/0022500 A1 * | 1/2011 | Scheinfeld | G06Q 20/12 705/27.2 |
| 2011/0202615 A1 | 8/2011 | Fletcher | |
| 2011/0247037 A1 * | 10/2011 | Pandey | H04N 5/44543 725/42 |
| 2011/0264555 A1 | 10/2011 | Turner-Rielle | |
| 2011/0295749 A1 | 12/2011 | Scalisi | |
| 2012/0109781 A1 | 5/2012 | Felt et al. | |
| 2012/0276868 A1 | 11/2012 | Martell | |

* cited by examiner

EMAIL-BASED E-COMMERCE

CROSS-REFERENCE TO RELATED APPLICATION

This application is a Continuation of U.S. patent application Ser. No. 13/833,521 filed Mar. 15, 2013, which claims the benefit of U.S. provisional application No. 61/672,982, filed Jul. 18, 2012, which is incorporated herein by reference as if fully set forth.

BACKGROUND

The Internet has transformed the manner in which both businesses and customers approach commerce. From the business perspective, the Internet has widened the customer base from those located within driving distance from a store, to virtually anywhere in the world with access to the Internet. Small retailers can compete more effectively with large retailers, without the higher costs that are associated with a large physical store. Additionally, distribution networks have been transformed, so that smaller numbers of specialized products can be effectively and efficiently distributed and sold in commerce.

From the perspective of the consumer, the Internet has brought a plethora of new options. Consumers now have available to their goods from any store that has an Internet presence. There is a greater variety of stores and goods, and a greater amount of competition between stores. This competition keeps prices down for consumers.

However, commerce over the Internet is not without its problems. According to many current approaches to electronic commerce (e-commerce), a customer may register with a vendor (such as an online retailer) to receive emails that provide information about products that are offered for sale by the vendor. The emails may include hyperlinks that direct the user to web pages on the vendor's web site. Once they access the web site, the customer may obtain additional information about, and/or purchase, the products described in the emails.

If the customer originally received an email in a dedicated email application such as Microsoft Outlook, a different application (such as a web browser) must be used in order to view the web pages on the vendor's web site. Further, to purchase a product from the vendor's web site, customers are frequently required to enter payment information such as credit card information. Due to this switch to a different application and the entry of credit card information, the process of purchasing a product from the vendor becomes inconvenient and time-consuming.

Further, when non-profit organizations conduct email marketing campaigns, the donation process may be similar to that described above, and may be fraught with similar problems. Therefore, more streamlined and convenient approaches to e-commerce would be advantageous.

SUMMARY

A method for use in an e-commerce system may include a database storing information that includes an identifier of a customer, an email address or other electronic contact information of the customer, and an identifier of one or more products offered by a vendor. The method may further include at least one processor generating an advertising email message. The advertising email message may be addressed to the email address of the customer, and may include a mailto hyperlink. The mailto hyperlink may include a destination address field that indicates an email address of the e-commerce system, and a body field that indicates an email body that includes the identifier of the customer and the identifier of the product. The method may further include a network interface transmitting the advertising email message, and the network interface receiving an order email message. The order email message may indicate an order by the customer for the product. The order email message may be responsive to the advertising email message, and may be addressed to the email address of the e-commerce system. The body of the order email message may include the identifier of the customer, the identifier of the product and a quantity of the product. The at least one processor and the network interface may perform an order execution procedure based on the order email message, wherein the order execution procedure includes purchasing the product for the customer.

An e-commerce system may include a database, at least one processor, and a network interface. The database may be configured to store information that includes an identifier of a customer, an email address or other electronic contact information of the customer, and an identifier of one or more products offered by a vendor. The at least one processor may be configured to generate an advertising email message that is addressed to the email address of the customer, and includes a mailto hyperlink. The mailto hyperlink may include a destination address field that indicates an email address of the e-commerce system, and a body field that indicates an email body that includes the identifier of the customer and the identifier of the product. The network interface may be configured to transmit the advertising email message and to receive an order email message. The order email message may indicate an order by the customer for the product. The order email message may be responsive to the advertising email message, and may be addressed to the email address of the e-commerce system. The body of the order email message may include the identifier of the customer, the identifier of the product and a quantity of the product. The at least one processor and the network interface may be further configured to perform an order execution procedure based on the order email message, wherein the order execution procedure includes purchasing the product for the customer.

A computer-readable storage medium having processor-executable instructions stored thereon which, when executed by at least one processor in an e-commerce system, will cause the at least one processor to perform a method. The method may include storing information that includes an identifier of a customer, an email address or other electronic contact information of the customer, and an identifier of one or more products offered by a vendor. The method may further include generating an advertising email message, wherein the advertising email message is addressed to the email address of the customer, and includes a mailto hyperlink. The mailto hyperlink may includes a destination address field that indicates an email address of the e-commerce system and a body field that indicates an email body that includes the identifier of the customer, the identifier of the product and a quantity of the product. The method may further include transmitting, via a network interface, the advertising email message. The method may further include receiving, via the network interface, an order email message. The order email message may be responsive to the advertising email message, and may be addressed to the email address of the e-commerce system. The body of the order email message may include the identifier of the customer and the identifier of the product. The method may further include performing an order execution procedure based on the order email message, wherein the order execution procedure includes purchasing the product for the customer.

BRIEF DESCRIPTION OF THE DRAWINGS

A more detailed understanding may be had from the following description, given by way of example in conjunction with the accompanying drawings wherein.

DETAILED DESCRIPTION

Figure 1:
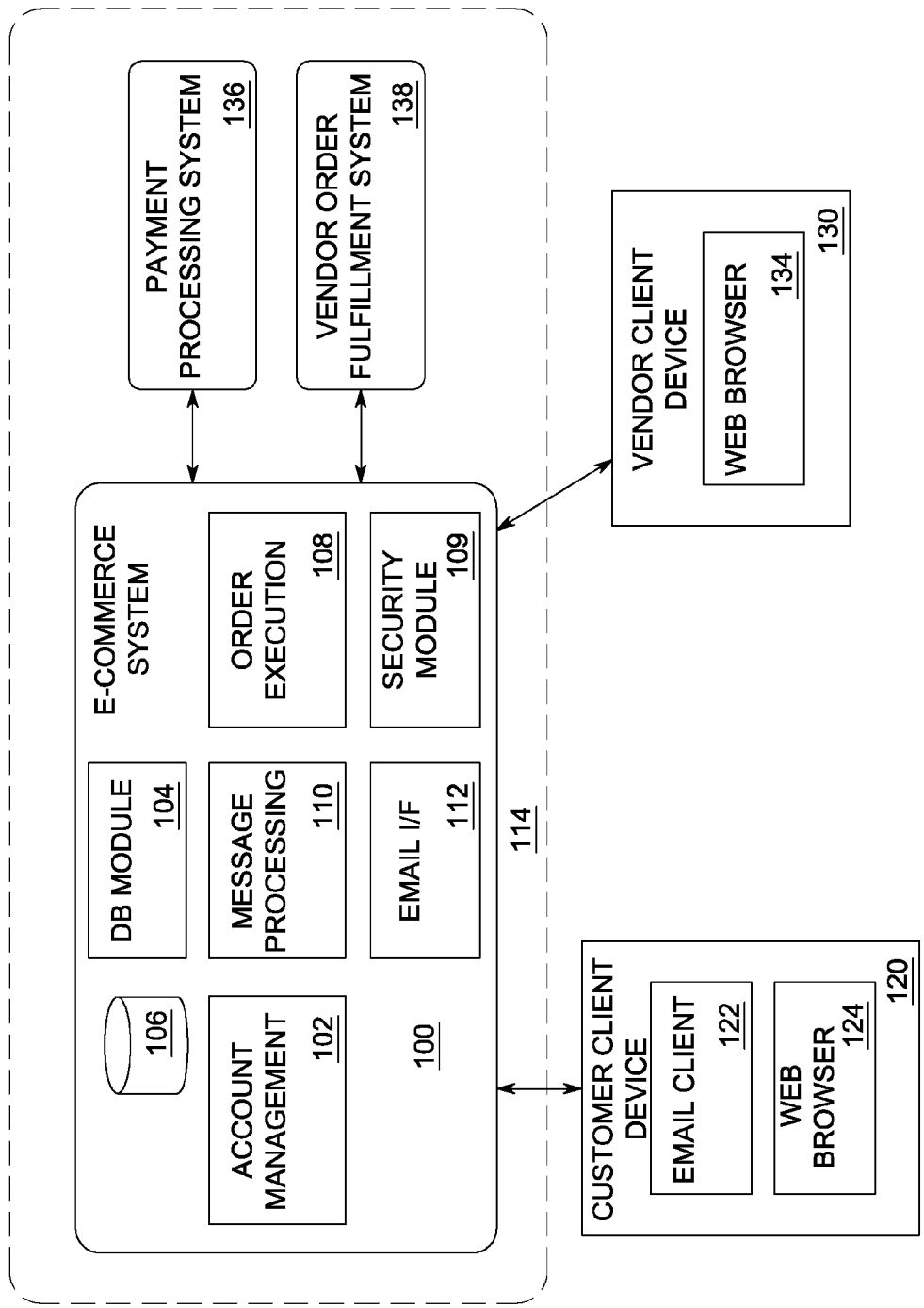
FIG. 1 shows a logical architecture for an electronic payment gateway for engaging in electronic commerce.

FIG. 1 shows an example logical architecture for an electronic payment gateway 114 for email-based e-commerce. The electronic payment gateway 114 may include a customer client device 120, an e-commerce system 100, a payment processing system 136, a vendor order fulfillment system 138, and a vendor client device 130. The e-commerce system 100 may include an account management module 102, a database module 104, an e-commerce database 106, a order execution module 108, a security module 109, a message processing module 110, and an email interface module 112. As will be described in further detail below, the e-commerce system 100 and customer client device 120 may exchange email messages to initiate and manage transactions such as donations to non-profit organizations and/or the purchase of goods and services. Also as will be described in further detail below, the e-commerce system 100 may communicate with the payment processing system 136 and the vendor order fulfillment system 138 to execute the transactions.

Although the electronic payment gateway 114 will be described hereinafter as handling e-commerce through email, this is used simply for ease of explanation. It should be understood that any form of electronic communication may be utilized in a similar manner including an a short messaging service (SMS) message, a multimedia messaging service (MMS) message, a text, an instant message, a facebook message, a tweet or any other type of current or future messaging type.

Accordingly, all modules specifically set forth in FIG. 1, such as the email interface module 112 and the email client 122, to illustrate the example herein, may be suitably replaced by a corresponding module, for example a text module, if a different form of electronic communication is utilized.

The account management module 102 in the e-commerce system 100 may manage data related to accounts for customers and vendors that participate in commerce via the e-commerce system 100. The account management module 102 may be or include, for example, a web application. Vendors may interact with the account management module 102 via a web browser such as the web browser module 134 in the vendor client device 130. As one example, a user of the vendor client device 130 may provide information to the account management module 102 such as: product and pricing information to be used for email advertisements to be sent to customers in email campaigns; email formatting information to be used for email advertisements to be sent to customers; financial information related to bank accounts and/or other types of financial accounts (such as e-Payment accounts such as PayPal accounts) that may be used to received payments from customers of the e-commerce system 100, such as account numbers and/or other identifying information; and/or other information. Customers may register with the e-commerce system 100 by interacting with the account management module 102 via a web browser such as a web browser module (not depicted) in the customer client device 120.

A user of the customer client device 120 may provide information to the account management module 102 via the web browser such as: an email address associated with the customer; financial information associated with the customer, such as a credit card information (such as a credit card number and expiration date), and/or other information related to bank accounts and/or other types of financial accounts (such as e-Payment accounts) that may be used to make payments to vendors via the e-commerce system 100; shipping address information; billing address information; preferences regarding which vendors the customer would like to receive email advertisements from; and/or other information. The account management module 102 may, via the database module 104, store information received from the customer client device 120 and/or the vendor client device 130 in the e-commerce database 106. The account management module 102 may also add information to the e-commerce database 106 when customers and vendors register with the e-commerce system 100, such as customer identifiers, vendor identifiers, and other identifying information.

The security module 109 generates a plurality of Universal Unique Identifiers (UUIDs) 202. A UUID is an identifier standard used in software construction, standardized by the Open Software Foundation (OSF) as part of the Distributed Computing Environment (DCE).

The intent of utilizing UUIDs is to enable distributed systems to uniquely identify information without significant central coordination. Since the identifiers have a finite size, it is possible for two differing items to share the same identifier. However, the identifier size and generation process are selected such that this is sufficiently unlikely.

In one embodiment, the UUIDs have a length of 32 characters, in groups, separated by a "dash" (-) character. For example, in one embodiment, the code may be: 891BE826-C023-4DAD-9E53-EE62B-836079C.

The message processing module 110 (in conjunction with the email interface module 112) may generate and transmit advertisement electronic messages, for example email messages, to customers that are registered with the e-commerce system 100, such as the user of the customer client device 120. The advertisement electronic messages may be Hyper-Text Markup Language (HTML) email messages, Rich Text Format (RTF) email messages, and/or may be defined according to any other appropriate format.

The advertisement electronic messages may include Uniform Resource Identifiers (URIs) or hyperlinks that are defined according to the mailto URI scheme. Each mailto URI or hyperlink may describe a return electronic message that may be generated by an email client module (such as the email client module 122) when that URI or hyperlink is selected. The generated message may include a number of parameters that indicate, for example, a product that was advertised in the advertisement email that the customer wishes to purchase. The generated message may then be sent to the e-commerce system 100, and received by the message processing module 110; when the generated message is received by the message processing module 110, the message processing module 110 may then initiate a transaction to purchase the product indicated in the message on behalf of the customer. In such an instance, the message processing module 110 may interact with the order execution module 108 to perform the transaction.

The email interface module 112 may be configured to use one or more email accounts that are associated with the e-commerce system 100, and to send and receive messages associated with the one or more email accounts. The email interface module 112 and/or the email client module 122 in the customer client device 120 may communicate email messages using technologies such as Simple Mail Transfer Protocol (SMTP), Post Office Protocol (POP) technology, Internet Message Access Protocol (IMAP), Remote Procedure Call (RPC) technology, HyperText Transfer Protocol (HTTP), and/or other appropriate technologies. The interface module 112 and/or the email client module 122 may use these technologies to transmit and/or receive email messages via one or more email servers (not depicted). The email client module 122 may be or include an email client such as Microsoft Outlook, Thunderbird, a web browser application, or any other client application for the communication of email messages. In an instance where the email client module 122 is or includes a web browser application, the email client module 122 may be the same web browser described above that may be used to communicate with the account management module 102; alternatively the email client module 122 and the web browser described above that may be used to communicate with the account management module 102 may be different.

The payment processing system 136 may be, as one example, a payment gateway that is operated by an acquiring financial institution. In an instance where the payment processing system is a payment gateway, the payment processing system 136 may have a connection to one or more banking networks (not depicted) that it may use to process payments. The order execution module 108 may communicate with the payment processing system 136 using technology such as Transport Layer Security (TLS) or Secure Sockets Layer (SSL) technology. The vendor order fulfillment system 138 may be an order management system (OMS), Enterprise Resource Planning (ERP), supply chain management, electronic purchasing system, inventory control system, or any other appropriate system for fulfilling orders.

The e-commerce database 106 may store information such as information that describes email campaigns, email advertisements that may be sent to customers, customer information, vendor information, product information, donation-related information, order status information, and/or other information. Further the e-commerce database 106 may store information that indicates correspondences between different email campaigns, advertisements, customers, vendors, products, donations, information related to order statuses, and/or other information. For each email campaign, the e-commerce database 106 may store information that include an identifier of the vendor associated with the campaign, identifiers of the products associated with the campaign, and/or other information. For each order that is placed with the e-commerce system 100, the e-commerce database 106 may store information such as an identifier of the customer that placed the order, when the order was placed, an identifier of the vendor associated with the order, and/or other information.

For each product described in the e-commerce database 106, the e-commerce database 106 may store information that includes an identifier of the product (or donation), a description of the product, a title of the product, an identifier of the vendor associated with the product, a cost of the product, amount of the product in stock, and/or other information. According to one approach, data that describes donations may be handled within the e-commerce database 106 in the primarily the same way as the data that describes products.

As one example, the e-commerce database 106 may store information that indicates that a type of wine (e.g., "Wine One," with a product identifier of "0005") is sold by a vendor (e.g., "The Wine Shop," with a vendor identifier of "0163") for $15.00.

Further, the e-commerce database may also store information that indicates that an example vendor that is a non-profit or potential organization (e.g., "Charitable Organization," with a vendor identifier of "1043") may receive donations for $5.00, $10.00, $25.00, $50.00, and $100.00. Each of the different donation amounts may be stored in the e-commerce database 106 as a different product. For example, the $100 donation may have a product identifier (or "donation identifier") of "0099." Further according to this example, the e-commerce database 106 may store information that indicates that the product with identifier "0099" indicates a donation of $100.00 to a vendor with the identifier of "1043."

Alternatively or additionally, the e-commerce database 106 may store information (e.g., one or more flags or other fields) that indicates, for each product/donation, whether the product/donation relates to a donation or to a purchase of goods.

The e-commerce database 106 may be spread across one or any number of computer-readable storage media (not depicted). The e-commerce database 106 may be or include, for example, a relational database, a hierarchical database, an object-oriented database, a flat file, a spreadsheet, or a structured file. The database module 104 may interface with a database management system (not depicted) in order to add data to, modify data in, or obtain data from the e-commerce database 106. Alternatively or additionally, the database module 104 may perform database driver and/or database client functionality to interact with the database management system. The database management system may be based on a technology such as Microsoft SQL Server, Microsoft Access, MySQL, PostgreSQL, Oracle Relational Database Management System (RDBMS), Not Only SQL (NoSQL), or any other appropriate technology.

Each or any combination of the modules described above with reference to FIG. 1 (including the account management module 102, database module 104, order execution module 108, message processing module 110, email interface module 112, email client module 122, web browser module 134, and the web browser module in the customer client device 120) may be implemented as software modules, specific-purpose processor elements, or as combinations thereof. Suitable software modules include, by way of example, an executable program, a function, a method call, a procedure, a routine or sub-routine, one or more processor-executable instructions, an object, or a data structure. Additionally, the system 100 may comprise a single server or computer, or may comprise a plurality of servers or computers, or a much larger integrated or distributed computer network including a plurality of computers and communication devices and networks, such as is commonly referred to as "the cloud". One example of such an extended network is the Internet. The terminology customer client device 120 will be referred to hereinafter as comprising a mobile or stationary device or terminal, commonly embodied as a handheld device such as a smartphone shown in FIG. 2 or a tablet shown in FIG. 3.

Security and the integrity of information has become a primary concern of Internet users and Vendors alike. Accordingly, one feature of the present invention is a system and method for authenticating emails and ensuring the integrity of the email transaction.

Figure 4:
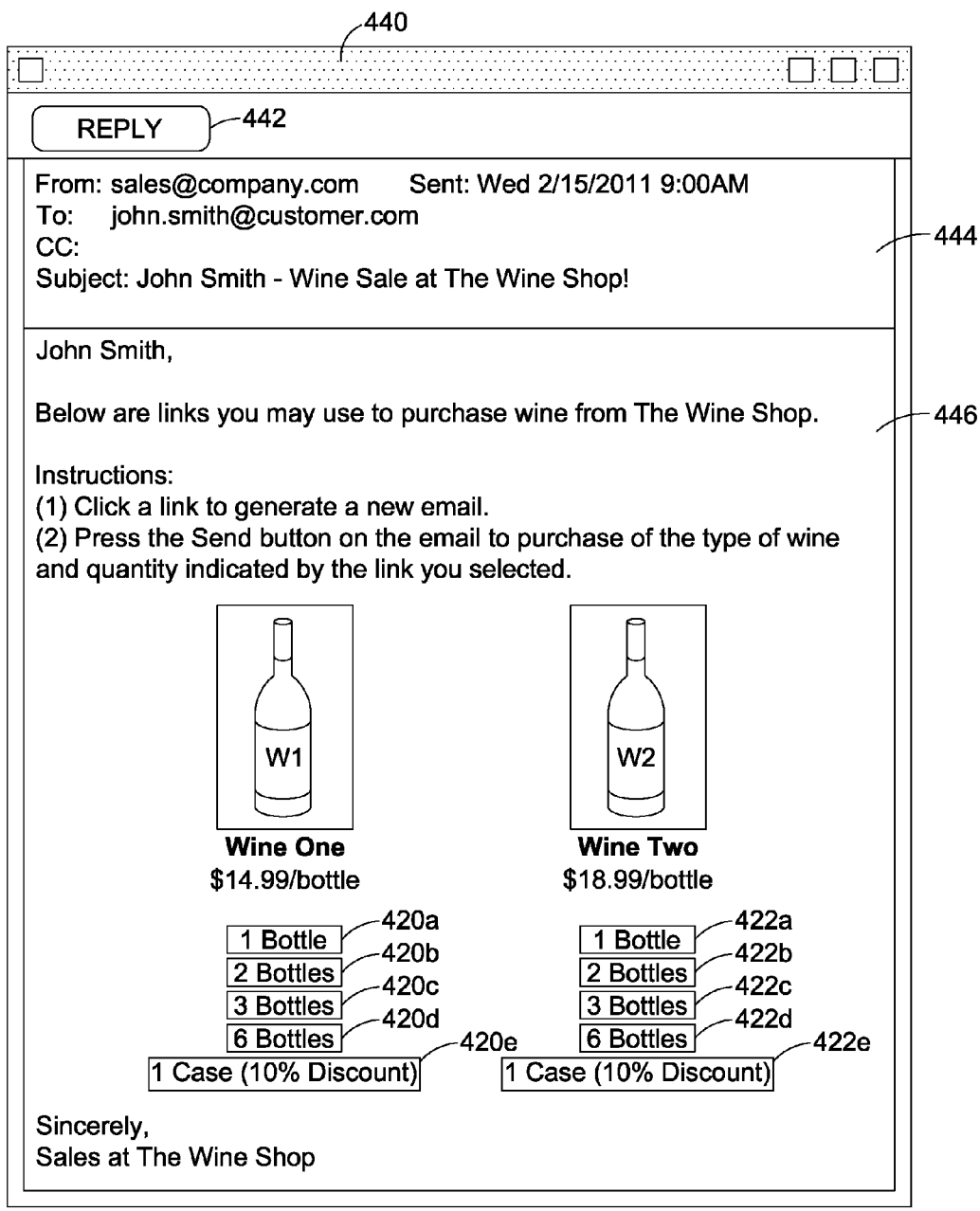
FIG. 4 is an example of an outgoing advertisement email message that solicits the purchase of goods from a vendor.

As will be described in greater detail hereinafter, the system and method utilize a plurality of unique identifiers that are associated with specific authentication information. These unique identifiers are selectively embedded in each transmitted outgoing email. FIG. 4 is an example of an outgoing email 440. As will be explained in detail hereinafter, the outgoing email 440 includes a plurality of selectable hyperlinks or buttons 420*a-e*, 422*a-e*, each of which having an associated embedded unique identifier. Any incoming email (i.e. reply email) that is received in response to the outgoing email 440 should include one or more of these embedded unique identifiers if the reply email is to be authenticated.

When a reply email is received, it is parsed for evidence of one or more of these embedded identifiers. The one or more of the embedded identifiers are compared to the authentication information. If the comparison is favorable, the authentication of the reply email is complete. If the comparison is not favorable, additional measures are taken to attempt to authenticate the reply email, or the authentication process is ultimately terminated, and the reply email is deemed to be unauthenticated and the transaction is denied.

Figure 5:
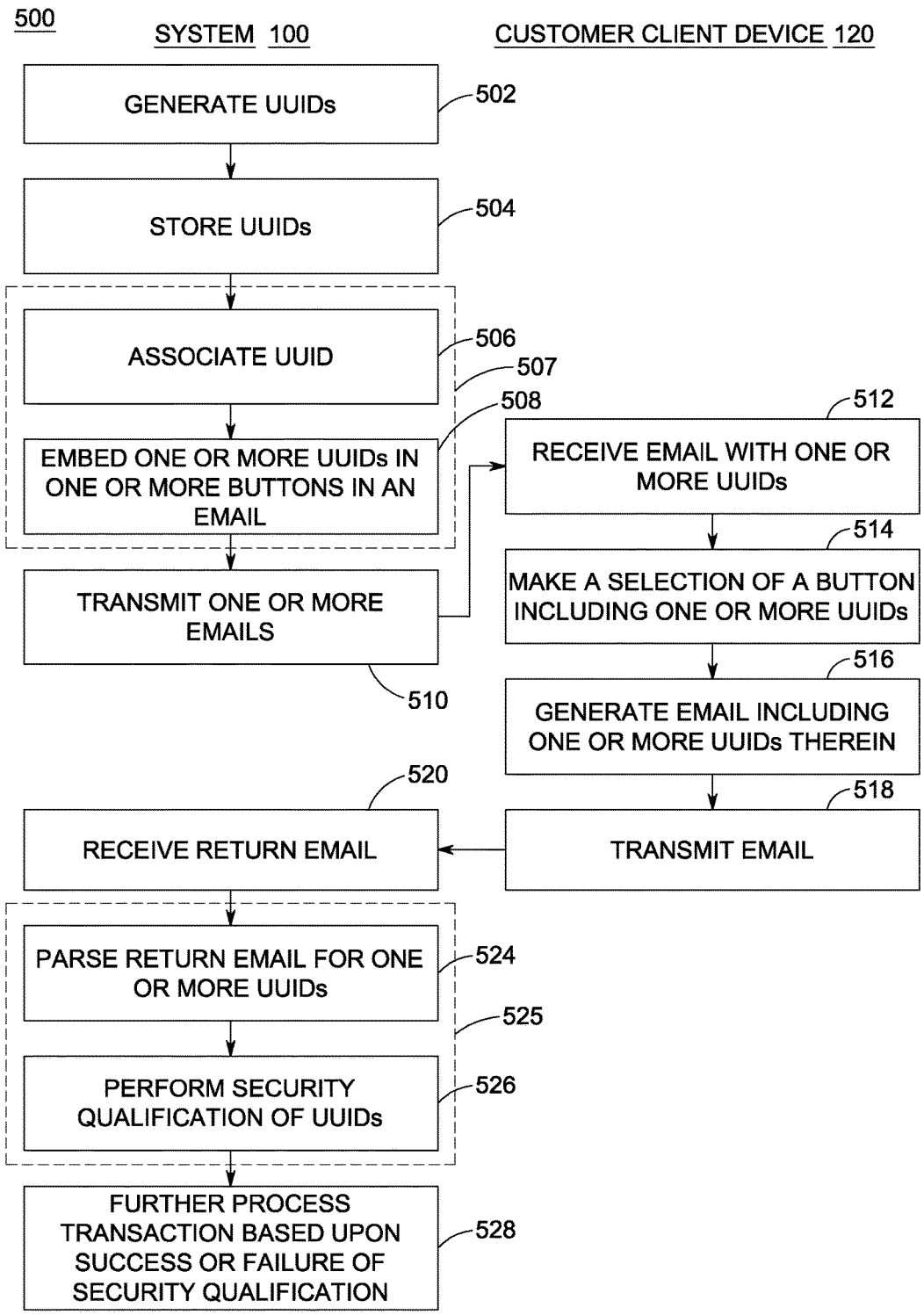
FIG. 5 shows a method for engaging in electronic commerce using email.

Referring to FIG. 5, a method 500 for authenticating an email in accordance with the present invention is shown. The method 500 is shown between the system 100 and a customer client device 120. As aforementioned, the security module 109 generates 502 a plurality of UUIDs. The UUIDs as delivered in an email message are "opaque", in that the associated authentication information is not ultimately derivable from parsing the UUID. Although the UUID will be associated with particular authentication information within the database 106, (such as a user, a campaign, a particular item or donation amount, an expiration date, etc.), this information is not derivable from the UUID.

Once the UUIDs are generated 502, they are stored 504 in the database 106 for later use. It should also be understood by those of skill in the art, that the storing 504 of the UUIDs is not necessary, in that the UUIDs may be generated 102 upon demand, (i.e. when they are needed), so that storing 504 of the UUIDs is not necessary. Accordingly, those of skill in the art should understand step 504 as being optional.

When a new email "campaign" is to be conducted, the UUIDs are retrieved from memory, (or the UUIDs are generated upon demand if they were not previously generated and stored). The UUIDs are associated 506 with particular authentication information to create an authentication control packet 300. This will be explained in greater detail hereinafter with reference to FIG. 3B.

Figure 6:
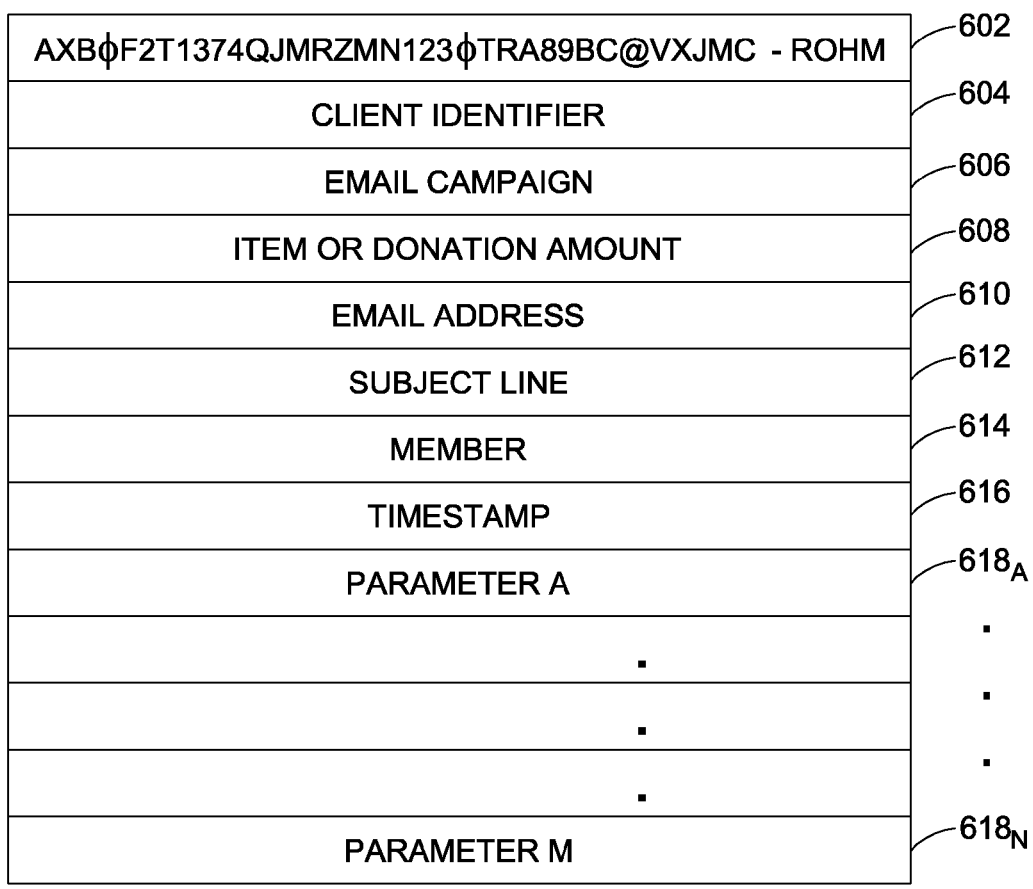
FIG. 6 is an example authentication control packet.

Referring to FIG. 6, an authentication control packet 600 is shown. The portions of the authentication control packet 600 will be described with reference to FIG. 6, and the related portions of an associated email 440 will be described with reference to FIG. 4. The authentication control packet 600 includes a UUID 602 and a plurality of fields 604-618$_N$ relating to authentication information. Although specific fields 604-618$_N$ are shown and described herein, it should be understood by those of skill in the art that a subset of these fields may be used, more fields may be added to this list of fields, or a completely new set of fields may be used without departing from the teachings herein.

As will be described in detail hereinafter, the UUID 602 is the unique identifier that will be imbedded in a portion of an email, for example outgoing email 440 shown in FIG. 4, and parsed from a reply email and used for authentication. In this particular example, the fields 604-618$_N$ include a client identifier field 604, an email campaign field 606 an item or donation amount field 608, an email address field 310, a subject line field 312, a member field 314 and a timestamp field 316. As is graphically illustrated by fields 618$_A$-618$_N$, a plurality of other fields relating to other identification parameters may optionally be included.

The client identifier field 604 identifies the particular client or vendor who has initiated the email "campaign". By way of example, if the vendor is The Wine Shop, the client identifier field 604 will include the name The Wine Shop, or an alpha-numeric identification thereof.

The email campaign field 606 identifies the particular email "campaign" of which the email is a part. By way of example, a particular vendor may wish to send out several emails to all or portions of its customers during different times of the year, to different customers or highlighting different products. Each of these emails is referred to hereinafter as an email "campaign". The email campaign field 606 identifies one of the email campaigns of which this UUID 602 is a part.

The item or donation amount field 608 identifies a particular item or a particular donation amount that this UUID 602 is associated with. For example, the UUID 602 may be associated with the "one bottle of red wine" button selection. In an alternative example, the UUID 602 may be associated with a donation amount of $150.

The email address field 610 identifies the email address to which the UUID 602 will be sent.

The subject line field 612 identifies the subject line of the email in which the UUID 602 will be sent.

The member field 614 identifies the member associated with the email address to which the UUID 602 will be sent.

The timestamp field 616 identifies the time at which the email associated with the UUID 602 is sent.

The parameter A—parameter M fields $618_A$-$618_N$ graphically represent a plurality of other fields that may be used to provide additional levels of security and verification. For example, emails may be send from one or more servers or countries, or may include one or more "keys" that will be later used to verify whether a particular email is authentic.

Referring back to FIG. 5, after each UUID is associated is associated 506 with particular authentication information to create an authentication control packet 600, one or more UUIDs are embedded in an email 440 as one or more buttons 420*a-e*, 422*a-e*, as shown in FIG. 4. The process 507 of steps 506 and 508 will be described in greater detail with respect to FIG. 7.

The process 507 begins with the retrieval 702 or generation of one or more UUIDs. An associated email is generated 704, and the one or more UUIDs are associated 706 with (or embedded into) one or selectable buttons 420*a-e*, 422*a-e* within the email 440. The one or more buttons 420*a-e*, 422*a-e* are inserted 708 into the email 414, and then the remainder of the information is inserted 710 into the email 440. The UUID along with the authentication control packet 600 is then stored 712.

Figure 7:
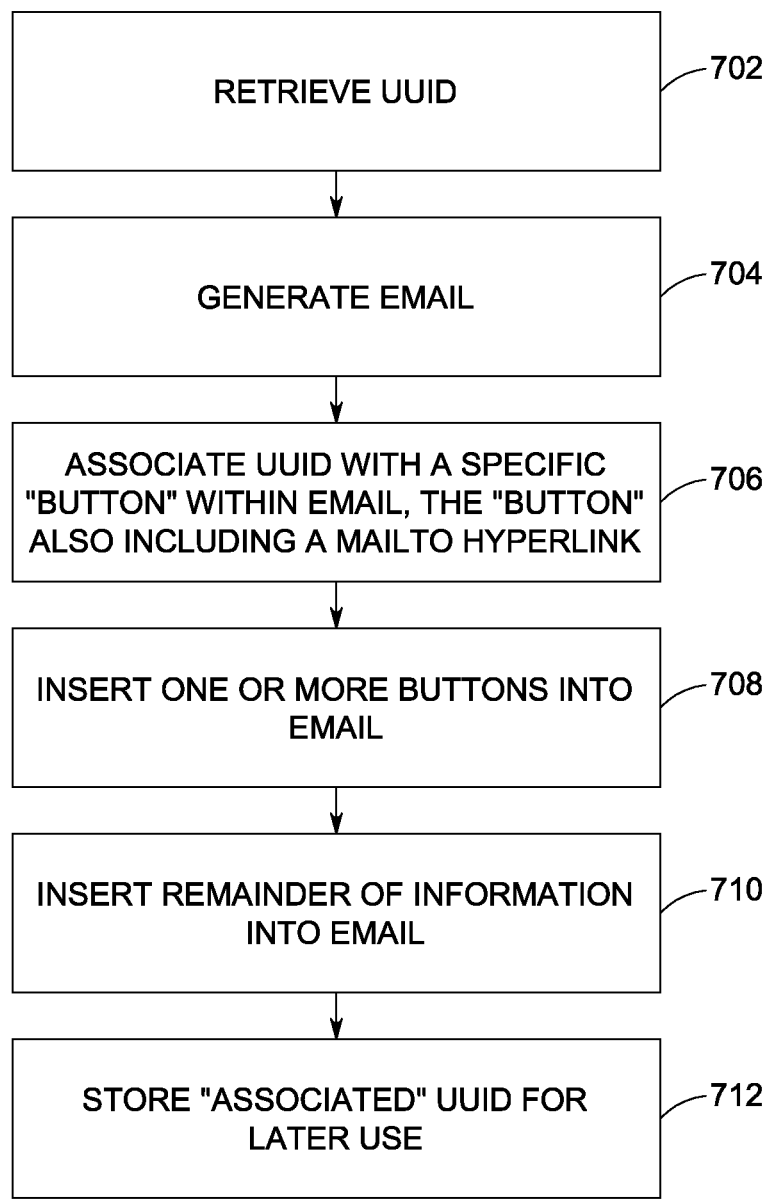
FIG. 7 is a flow diagram of a process for generating and embedding UUIDs into an email.

It would be understood by those of skill in the art that although the steps 702-712 of FIG. 7 are shown in a particular order, some of the steps may be changed or eliminated. For example, when an email is generated 704, it may include all of the relevant information, and therefore step 710 may be unnecessary. Additionally, steps 706 and 708 may be performed simultaneously by associating the UUID with a button as it is being embedded in an email. These changes will not depart from the spirit or scope of the present invention.

Referring back to FIG. 5, the email 440 is then transmitted 510 from the system 100 to the customer client device 120.

The customer client device 120 receives 512 the email 440, and the user is allowed to review the email 440 and make a selection 514 of one or more of the buttons 420*a-e*, 422*a-e*.

The selection 514 of one or more of the buttons 420*a-e*, 422*a-e* by the user causes the customer client device 120 to generate 516 a return email which includes the UUIDs associated with the one or more selected buttons 420*a-e*, 422*a-e*. The return email included the UUIDs is then transmitted 518 from the customer client device 120 to the system 100. It should be noted by those of skill in the art that although the return email is shown being transmitted 518 back to the system 100, it may also be sent directly to a third party site, or through a third party site to the system for processing without departing from the spirit and scope of the present invention.

The system 100 (or the third party site) receives 520 the return email and parses 524 the return email for the one or more UUIDs, and optionally other important authentication information, as will be explained in greater detail hereinafter. Once the UUIDs and the optional authentication information is parsed 524 from the return email, security qualification on the UUIDs is performed 526.

Figure 8:
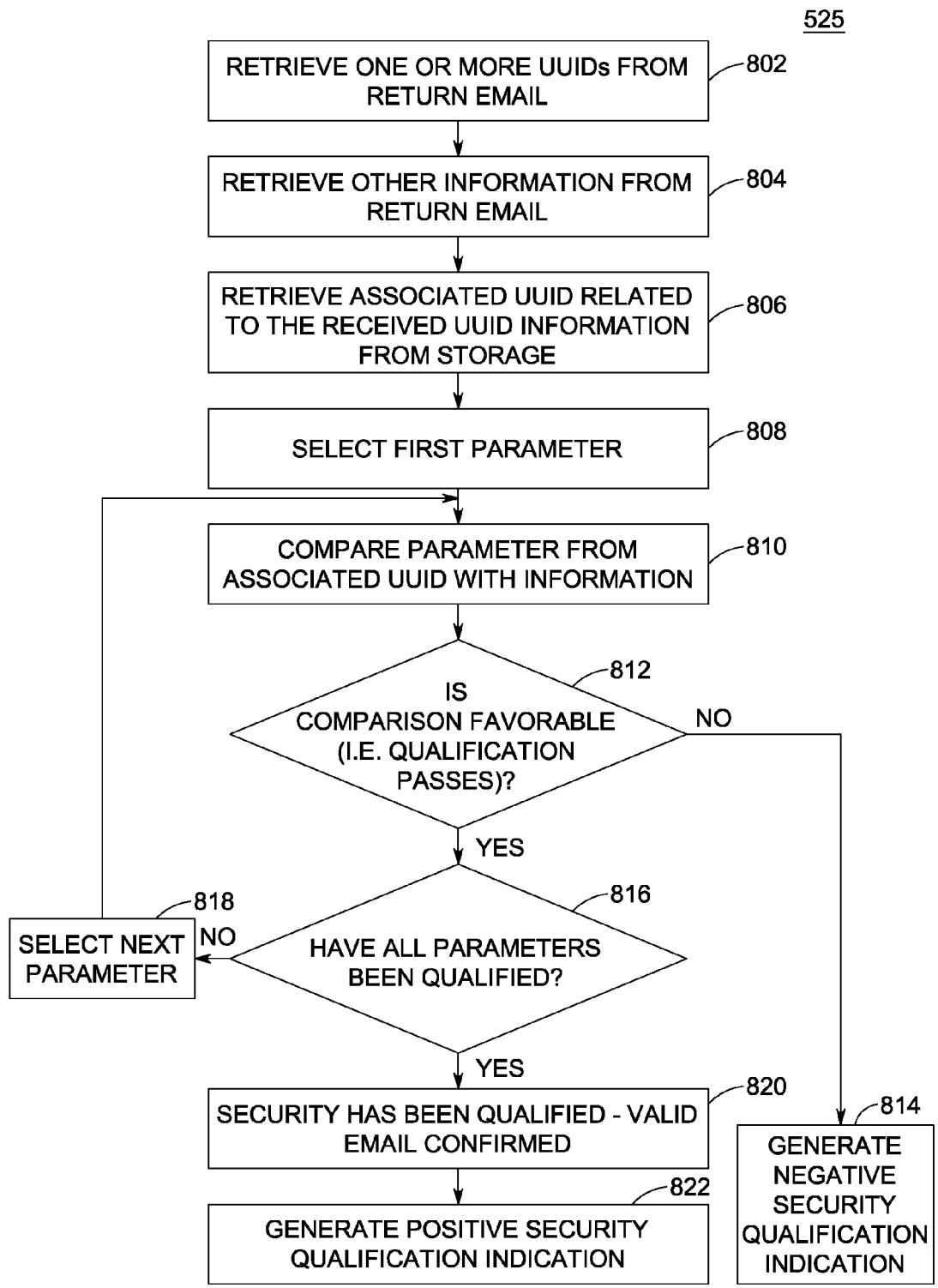
FIG. 8 is a flow diagram of a process for analyzing return emails and performing security qualifications on the return emails.

The process 525 of steps 524 and 526 will be described in greater detail with respect to FIG. 8.

The return email is parsed 802 for the one or more UUIDs that are embedded in the return emails, and is also optionally parsed for other important authentication information 804.

Those of skill in the art would understand that steps 802 and 804 may be performed in opposite order, or may be performed together. The authentication control packet 600 is retrieved 806 and one of the parameters 602-$618_N$ is selected 808 and compared 810 to the information parsed from the return email. In a simplest example, the UUID that is parsed 802 from the return email is compared 810 to the UUID 602 in the authentication control packet 600 to determine if they match. If the match is not favorable, a negative security qualification indication is generated 814. In essence, that selected parameter 602 is indicated as failed.

It should be understood that the process 525 may be terminated after only a single failure, or a certain threshold of positive matches for the selected parameters may be set. In another alternative, the parameters may be selectively weighted, and the process 525 may be terminated or deemed a success based upon a certain threshold being missed or met, respectively.

Referring to step 816, if not all of the parameters have been reviewed, the next parameter is selected 818 and the process continues at step 810. If all of the parameters have been reviewed and qualified 816, a valid email has been confirmed 820 and a positive security qualification indication is generated 822.

Referring back to FIG. 5, the transaction is continued or denied 528 based upon the success or failure of the security qualifications determined in step 525. Step 528 is shown in greater detail with reference to FIG. 9.

Figure 9:
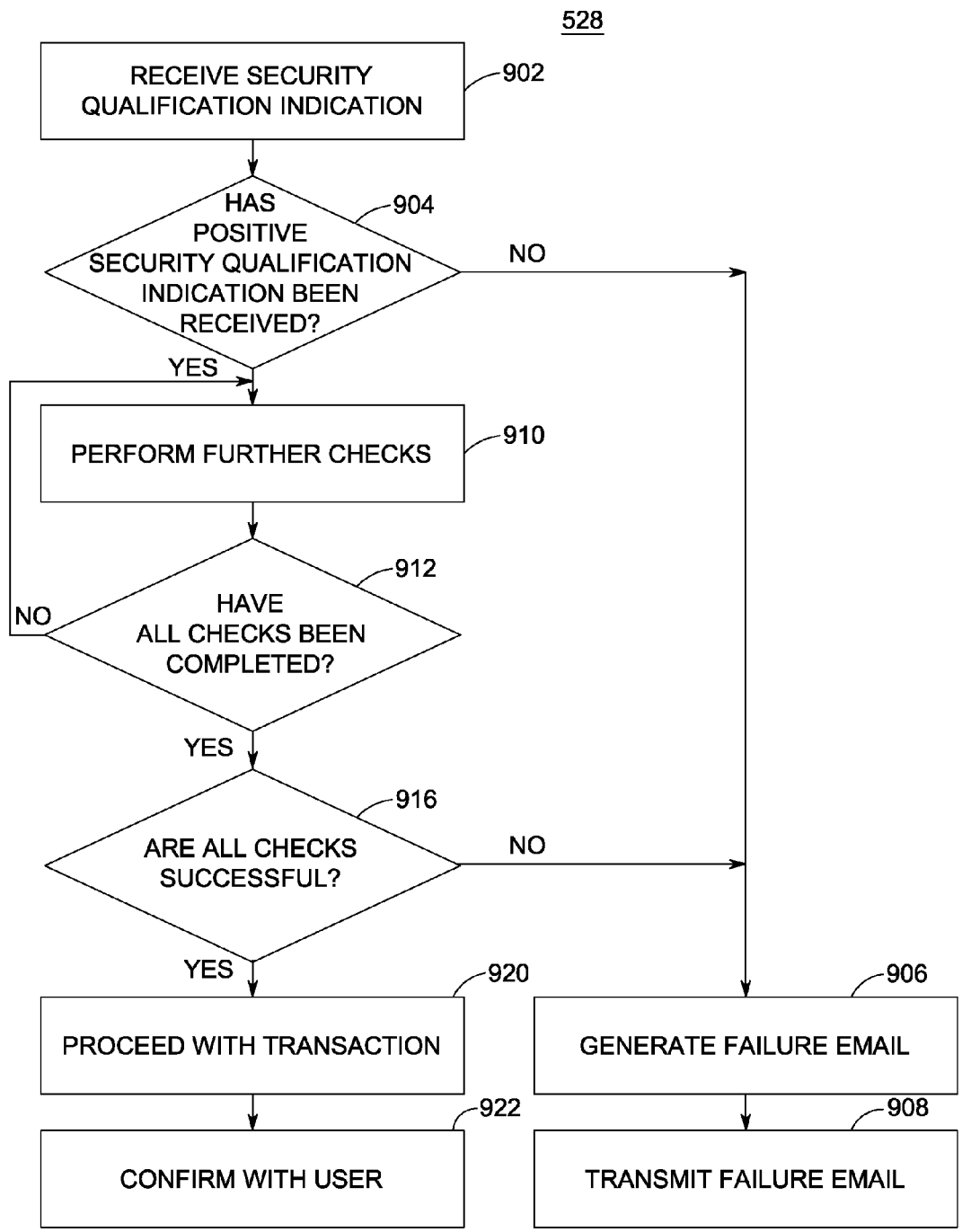
FIG. 9 is a more detailed flow diagram of a process for performing additional quality checks on return emails.

Referring to FIG. 9, one or more security qualification indications are received 902, and it is determined 904 whether an "overall" positive indication has been received as determined at step 822, whether it is by threshold, weighting, or some other method. If this indication is negative, a failure email is generated 906 and transmitted 908.

This failure email may not be the end of the process. For example, the failure email may be an opportunity for the vendor to gain another user, if a user other than the intended user sent in a return email. Additionally, other security questions may be sent in the failure email in order to "rehabilitate" the rejected email.

Even if the positive security qualification has been determined at 904, some vendors may require additional checks 910. If all checks have not been completed, step 910 is repeated.

For example, each vendor may have a separate security check such as a password, a biometric identifier of the person, a keyword or an identification of the particular user's computer. Step 910 permits the process 528 to be customized by different vendors.

Once it has been determined 912 that all checks have been completed, it is determined whether all checks are successful 916. Again, this step 916 may require all checks to be positive, may require a certain number or percentage of checks be completed, or may require that a certain "weight" be achieved in a weighting scheme that applies more weights to certain checks than to others. If the checks are determined 916 to be successful, the transaction proceeds 920 and a confirmation is sent 922 to the user.

If the checks are determined 916 to be unsuccessful, the transaction proceeds to generate 906 a failure email and send and 908 the failure email to the user as described hereinbefore.

Figure 10:
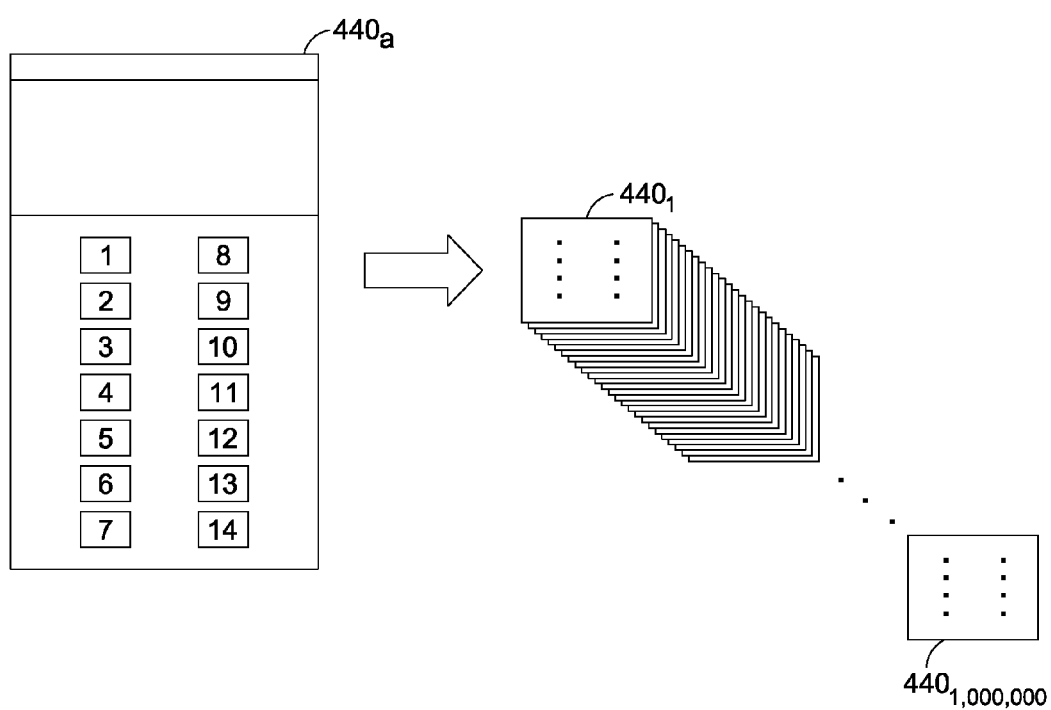
FIG. 10 is a graphical representation of a plurality of emails with a plurality of buttons.

Referring to FIG. 10, the result of the processes described hereinbefore are that each email 440 with a plurality of buttons (i.e. 1-14 as shown in FIG. 10) is generated. As is graphically represented in the left side of FIG. 10, each button has a UUID embedded within it.

Additionally, as is graphically represented in one million emails 4401 through 440$_{1,000,000}$ on the right side of FIG. 10, each separate button within each separate email has a unique UUID. Therefore, if each email has 14 different buttons, and one million emails are generated, then 14 million UUIDs are generated and embedded into the emails This ensures that when a button is selected within an email, and the UUID is sent in a return email, the system 100 will know exactly which specific button from which specific user was selected. Along with the security qualifications, the present invention ensures not only identity, but also security.

In addition to, or as an alternative to, the features of these modules described above with reference to FIG. 1, these modules may perform functionality described below with reference to the remaining Figures.

Figure 11A:
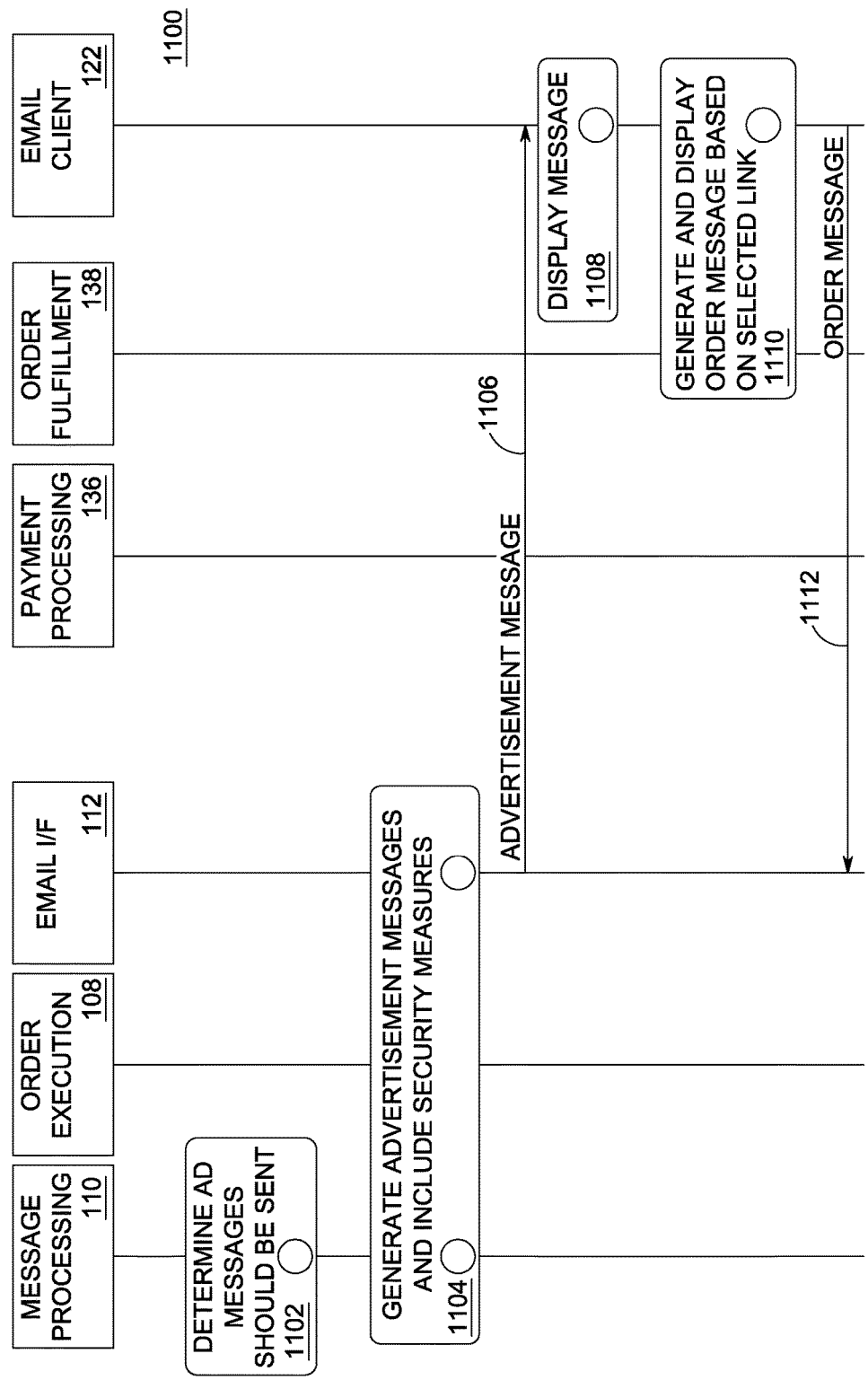
FIG. 11, consisting of 11A and 11B is a flow diagram of method for engaging in electronic commerce using email.
Figure 11B:
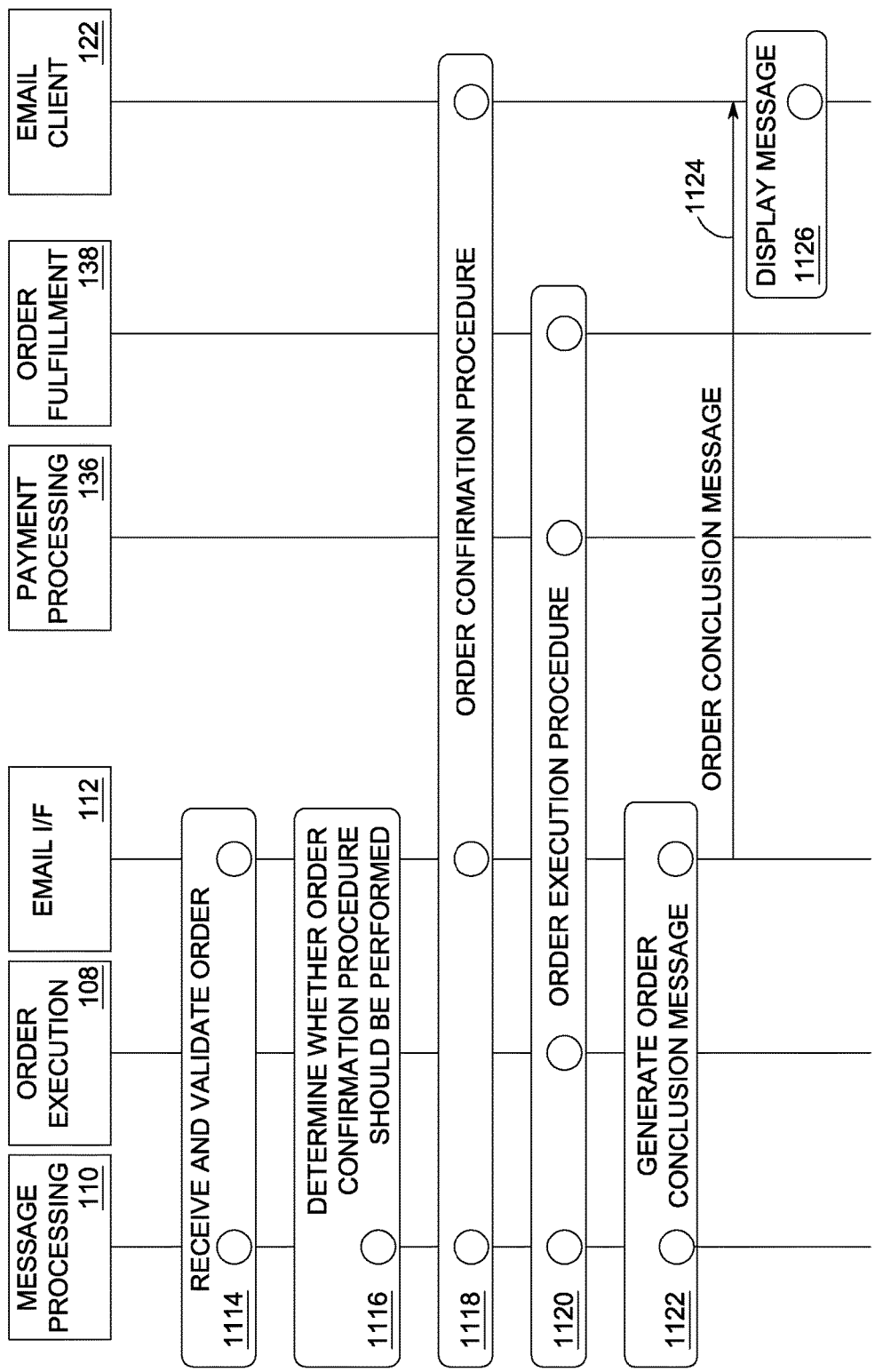

FIG. 11, (comprising 11A and 11B) is an example method 1100 for email-based electronic commerce. FIG. 11 shows components of the e-commerce system 100, including the message processing module 110, the order execution module 108, and the email interface module 112. FIG. 11 also show the email client module 122 of the customer client device 120, as well as the payment processing system 136 and the vendor order fulfillment system 138.

The method 1100 of FIG. 11 may begin with the message processing module 110 determining that an advertising email message should be sent to customers of the e-commerce system 100 (step 1102). This determination may be based on, for example, information provided by a user of the vendor client device 130 to account management module 102 in the e-commerce system 100 via the web browser module 134 in the vendor client device 130. This information may include, for example, an instruction that indicates that the advertising email message should be sent. Alternatively or additionally, this information may include information that defines an email campaign. Information that defines an email campaign may include information that describes the format and contents of the advertising email message. For example, the information may indicate the products that should be indicated in the advertising email message, the quantities in which they may be bought, prices for the products, and/or other information.

Alternatively or additionally, in an instance where the advertising message is a solicitation for a donation to a non-profit organization, this information may describe amounts of suggested donations.

Information that defines the email campaign may also include parameters that define customers to whom the advertising emails should be sent. For example, a campaign may be defined such that the advertising emails will be sent only to users who have not purchased an item from the vendor since a given time period.

The message processing module 110 and/or the email interface module 112 may then generate the advertising email messages that are to be transmitted according to the information that describes the email campaign (step 1104). This may include, for example, the message processing module 110 obtaining information from the e-commerce database 106 via the database module 104 that indicates a list of email addresses and other identifying information (such as customer identifiers) for customers that are the intended recipients of the email messages as described in the email campaign information. The advertising email messages may indicate that they are being sent by one of the email accounts used by the e-commerce system 100. This may also include the message processing module 110 assigning an email campaign identifier that is associated with this email campaign.

Further, the email messages generated by the message processing module 110 may include one or more mailto hyperlinks that define the contents of email messages that are generated when the mailto hyperlinks are selected. For example, and as will be described in further detail below, the message processing module 110 may generate the contents of the mailto hyperlinks such that the hyperlinks include information that identifies products that are being sold by a vendor. When the mailto hyperlinks are selected, new email messages are generated that may be used to initiate orders to purchase the identified products.

Further, the email messages generated by the message processing module 110 may include one or more security features generated by the security module 109 within the mailto hyperlinks that define the identity of each button within the email. The security features may include the parameters as discussed with reference to FIG. 6.

Mailto hyperlinks in the advertising email messages may include one or any combination of the following fields: a "mailto:" and/or "to" field that indicate one or more email addresses of recipients of the new message; a "Copy To" or "CC" field that indicates one or more email addresses of recipients to whom a copy of the new message should be sent; a "Blind Copy To" or "BCC" field that indicates one or more email addresses of recipients to whom a blind copy of the new message should be sent; a field that indicates the subject of the new message; and a field that indicates the body of the new message. The mailto hyperlinks may be defined according to the format described in Internet Engineering Task Force (IETF) RFC2368, which is incorporated by reference as if fully set forth herein.

The email interface module 112 may then transmit one of the generated advertising email messages to the email client module 122 (step 1106). The email message may be received by the email client module 122 and displayed by the email client module 122 (step 1108).

Referring now to both FIG. 11 and FIG. 4, FIG. 4 shows an email display window 440 that may be used by the email client module 122 to display a first example email message from the message processing module 110 (step 1100). The email display window 440 may include a Reply button 442, a control area 444, and a message body area 446. The control area 444 may display control and/or header information associated with the email message, such as the email addresses of the sender and recipient of the message. According to this example, the control area 444 shows that the sender of the message has the email address "sales@company.com." This is an email address that may be associated with an account used by the e-commerce system 100 for the communication of email messages. Further to this example, the control area 444 shows that the email address of the example recipient of the message (John Smith) is "john.smith@customer.com." The control area 444 may also display information such as a subject of the email message and the time the email message was sent. The Reply button 442 may respond to user input to generate a new display element (not depicted) to respond to the email message.

The message body area 446 may display the body of the email message. As shown in FIG. 4, the message body area 446 may display an example email message that shows information related to two example products (Wine One and Wine Two) that are being offered for sale by an example vendor (The Wine Shop). The message body area 446 includes a picture of a bottle of each type of wine, as well as the price for a bottle of each type of wine. The message body area 446 also includes, under the picture of the bottle of Wine One, a number of mailto hyperlinks, such as the "1 Bottle," hyperlink 420*a* "2 Bottles," hyperlink 420*b* "3 Bottles", hyperlink 420*c* "6 Bottles," hyperlink 420*d* and "1 Case (10% Discount)" hyperlink 420*e*. The message body area 446 also includes similar links under the picture of the bottle of Wine Two. These links 420*a-e* may be defined according to the mailto URI scheme or other appropriate format, and each may describe a new email message that may be generated by the email client module 122 when that link is selected.

The "1 Bottle" hyperlink 420*a* beneath the picture of the Wine One bottle may include information that describes an email message that, if received by the e-commerce system 100, will indicate to the e-commerce system 100 that John Smith would like to purchase one bottle of Wine One. As a further example, Wine One may have a product identifier of "0005," and John Smith may have a customer identifier of "0777." According to this example, the "1 Bottle" hyperlink may describe an email message that is addressed to an email account that is associated with the e-commerce system 100, and that includes a message body that includes the identifier for John Smith ("0777"), an identifier of the selected product ("0005"), and an identifier of the quantity that John Smith would like to order (in this example, a single bottle).

Alternatively or additionally, the email message described by the hyperlink may include information such as text that describes the order, an identifier of the vendor (in this example, The Wine Shop), an email campaign identifier, and/or other information. Similarly, the "2 Bottles" hyperlink 420*b* beneath the picture of the Wine One bottle may include information that describes an email message that, if received by the e-commerce system 100, will indicate to the e-commerce system 100 that John Smith would like to purchase two bottles of Wine One. According to this example, and by way of example only and not to be limiting, the "2 Bottles" hyperlink 420*b* may be defined as follows:

```
<a href="mailto:sales@company.com?
subject=Purchase%20from%20Wine%20Shop%20&
body=You%20have%20created%20an%20order%20for%20two%20bottles%20o
f%o20Wine%20One.%20Press%20the%20Send%20button%20to%20complete%
20the%20order.%0A%0AProductID0005%20QualifierNA%20Qty0002%20Cus
tomerID0777%20CampaignID0003"
target="_blank">2 Bottles</a>
```

Similarly, the "3 Bottles," "6 Bottles," and "1 Case (10% Discount)" hyperlinks 420*c-e* beneath the picture of the Wine One bottle indicate corresponding information for three bottles, six bottles, and one case of bottles, respectively. Additionally, the "1 Bottle," "2 Bottles," "3 Bottles," "6 Bottles," and "1 Case (10% Discount)" hyperlinks 420*a-e* under the Wine Two bottle indicate corresponding information for Wine Two as that described above with respect to the mailto hyperlinks relating to Wine One.

The email client module 122 may receive a user input that indicates that one of the hyperlinks displayed in the message body area 446 is selected. The user input may be, for example, a mouse click, keyboard input, or any other type of input that indicates that a hyperlink is selected. Referring again to FIG. 2A, the email client module 122 may, in response to this user input, generate and display an order email message as specified by the selected hyperlink (step 248).

Figure 12:
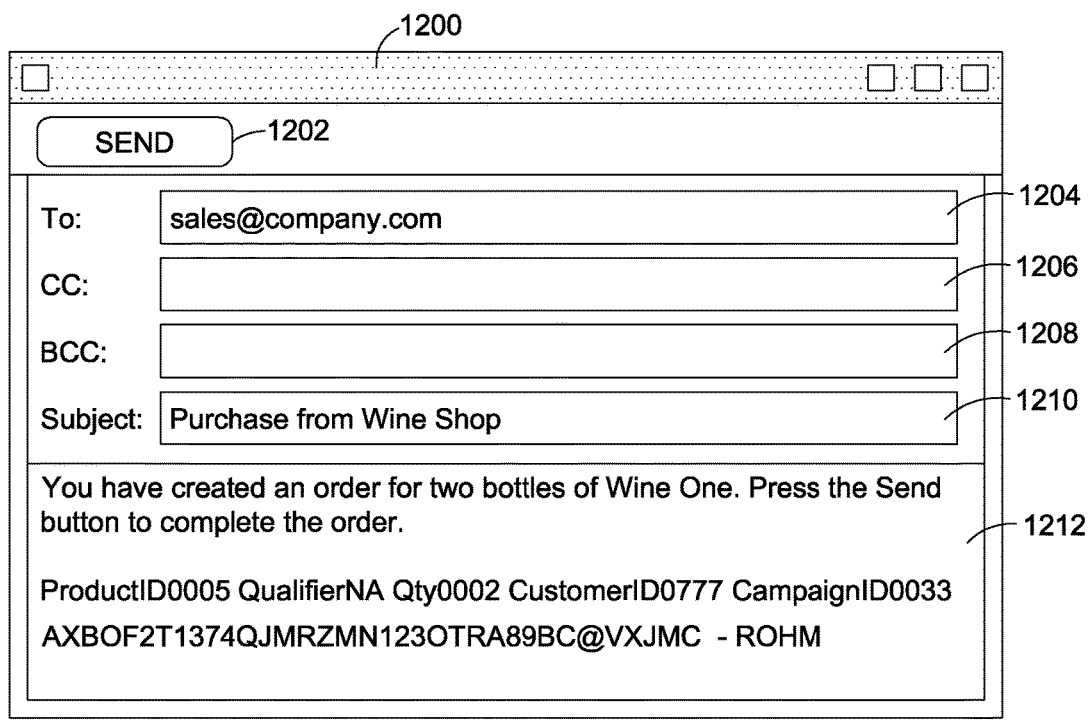
FIG. 12 is an email message for placing an order.

Referring now to FIG. 11, FIG. 4, and FIG. 12, FIG. 12 shows an example message composition window 1200 that may be displayed in response to a selection of a hyperlink from the message body area 446 of the email display window 440 of FIG. 4 (step 1110). The message composition window 1200 of FIG. 12 may include a Send button 1202, a To area 1204 a CC area 1206 a BCC area 1208, a Subject area 1210, and a message body area 1212. The Send button 1202 in the message composition window 1200 of FIG. 12 may be responsive to input from a user such as a mouse click, keyboard input, or any other type of input. The different areas 1204-1212 in the message composition window 1200 display different portions of an email message. For example, the To area 1204 includes text that indicates email addresses to which the email message is addressed, while the message body area 1212 displays the contents of the body of the email message. Each or any of these different areas 1204-1212 may be editable based on user input. Changes to the contents of these areas 1204-1212 may change the corresponding portion of the email message.

FIG. 12 shows an example wherein the "2 Bottles" hyperlink 420*b* beneath the picture of the Wine One and described above with reference to FIG. 3 is selected. The To area 1204 indicates that the message is addressed to sales@company.com. The Subject area 1210 indicates that the subject of the message is "Purchase from Wine Shop." The CC area 1206 and BCC area 1208 are blank. Continuing the example of FIG. 12, Wine One product has a product identifier of "0005" and John Smith has a customer identifier of "0777." Accordingly, the message body area 1212 includes the text "ProductID0005" and "CustomerID0777." To indicate that the user has selected the purchase of two bottles, the message body area 1212 includes the text "Qty0002." Further, the message body area 1212 includes the text "CampaignID0033," indicating that the order is associated with an email campaign with an identifier of "0033."

Alternatively, or in addition to the message body area having the text "ProductID0005," "CustomerID0777," "Qty0002," and "Camp aignID0033," which clearly refer to what is being selected and include proprietary information (such as customer ID), the message body area 1212 may include a UUID of the selected button or hyperlink. As shown, the UUID provides much more security, since it random and users cannot tamper with it as they could with the identifiable text information.

In an instance where a different hyperlink from the message body area 446 of FIG. 12 is selected, the display areas 1204-1212 in the message composition window 440 may include contents specified by the selected different hyperlink. For example, in an instance where one of the hyperlinks 422*a*-422*e* related to Wine Two is selected, the message body area would not include the text "ProductID0005," but would include text that indicates the corresponding identifier for Wine Two. Alternatively, a different UUID will be included.

Figure 13:
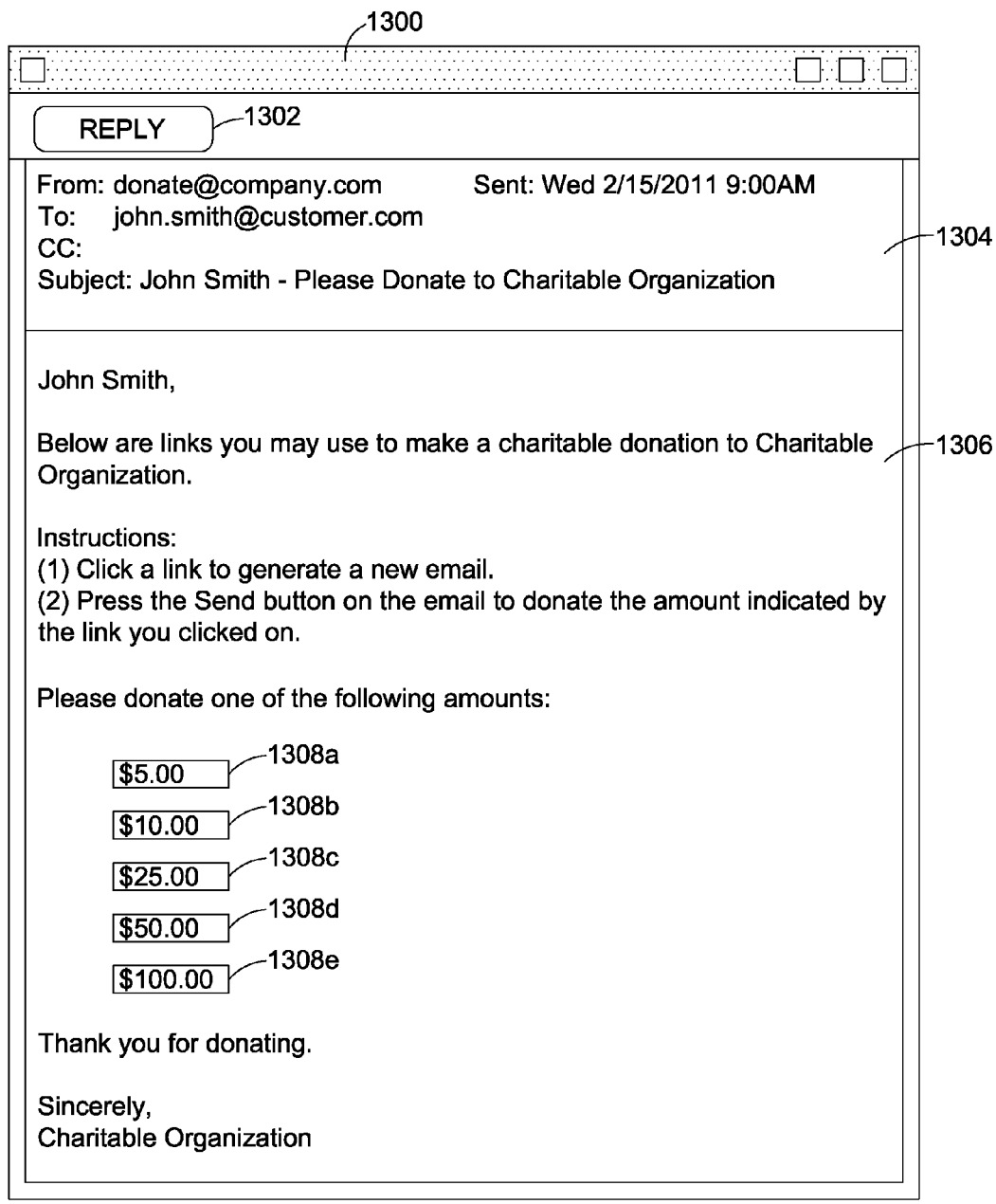
FIG. 13 is an advertisement email message that solicits a donation to a non-profit organization.

Referring now to both FIG. 11 and FIG. 13, FIG. 13 shows an email display window 1300 that may be used by the email client module 122 to display a second example email message from the message processing module 110 (step 1108). The email display window 1300 includes a Reply button 1302, a control area 1304, and a message body area 1306. These display elements 1302, 1304, 1306 may possess similar and/or analogous characteristics and/or perform similar functionality as corresponding display elements 442, 444, 446 in the email display window 1300 of FIG. 4. According to the example of FIG. 13, the control area 1304 shows that the sender of the message has the email address "donate@company.com." This is an email address that may be associated with an account used by the e-commerce system 100 for the communication of email messages. Further to this example, the control area 544 shows that the email address of the example recipient of the message (John Smith) is "john.smith@customer.com."

As shown in FIG. 13, the message body area 1306 of the email display window 540 may display an example email message that shows information related the solicitation of donations for an example non-profit organization ("Charitable Organization"). The message body area 1306 also includes a plurality of buttons 1308*a-e* or mailto hyperlinks, such as the "$5.00,"hyperlink 1308*a* "$10.00," hyperlink 1308*b* "$25.00," hyperlink 1308*c* "$50.00," hyperlink 1308*d* and "$100.00" hyperlink 1308*e*. These hyperlinks may possess similar and/or analogous characteristics, and/or include similar and/or analogous information, as the mailto hyperlinks described above with reference to FIG. 4. Each button 1308*a-e* has an associated UUID. The "$5.00" hyperlink 1308*a* describes an email message that, if received by the e-commerce system 100, will indicate to the e-commerce system 100 that John Smith would like to donate $5.00 to Charitable Organization. Similarly, the "$10.00," "$25.00," "$50.00, and "$100.00" hyperlinks 1308*b-e* describe email messages with corresponding information for $10.00, $25.00, $50.00, and $100.00 donations, respectively.

The email client module 122 may receive a user input that indicates that one of the hyperlinks displayed in the message body area 1306 is selected. Referring again to FIG. 11, the email client module 122 may, in response to this user input, generate and display an order email message as specified by the selected hyperlink (step 1110).

Figure 14:
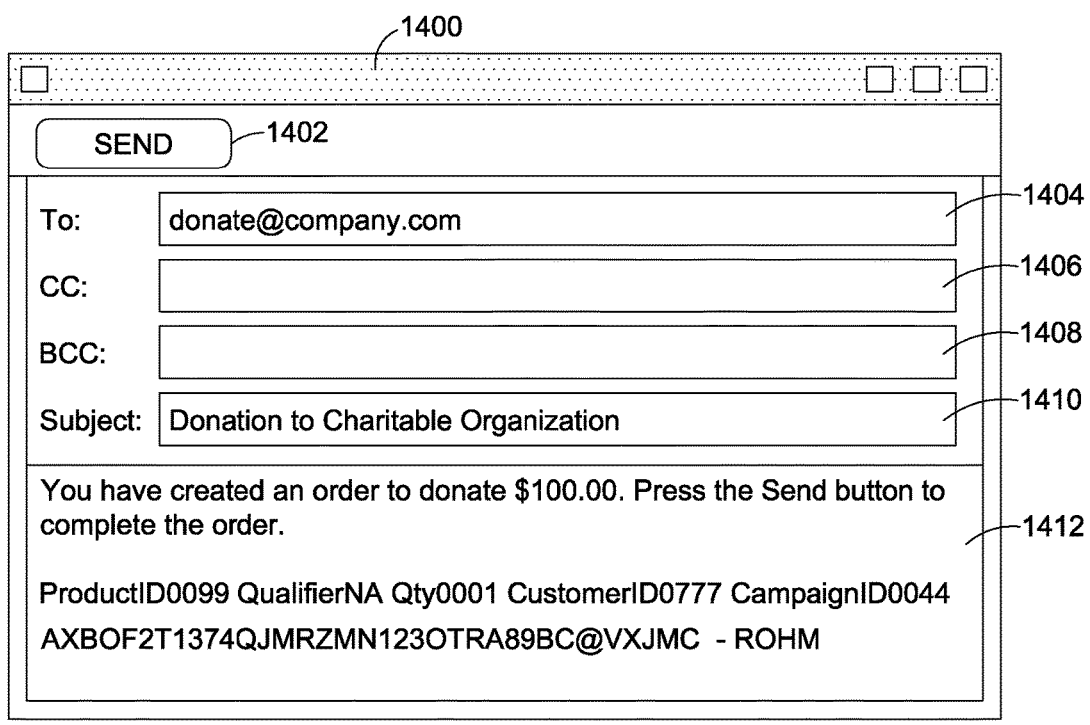
FIG. 14 is an email message for donating to a non-profit organization.

Referring now to FIG. 11, FIG. 13, and FIG. 14, FIG. 14 shows an example message composition window 1400 that may be displayed in response to a selection of a hyperlink from the message body area 1306 of the email display window 1300 of FIG. 13 (step 1108). The message composition window 1400 of FIG. 14 may include a Send button 1402, a To area 1404, a CC area 1406, a BCC area 1408, a Subject area 1410, and a message body area 1400. These display elements 1402-1412 may possess similar and/or analogous characteristics and/or perform similar functionality as corresponding display elements 1202-1212 in the message composition window 1200 of FIG. 12.

FIG. 14 shows an example wherein the "$100.00" hyperlink 1308*e* from the message body area 1306 of the email display window 1300 of FIG. 13 is selected. The To area 1404 indicates that the message is addressed to donate@company.com. The Subject area 1410 indicates that the subject of the message is "Donation to Charitable Organization." The CC area 1406 and BCC area 1408 are blank. According to this example, a donation of $100.00 to Charitable Organization has a product identifier of "0099," and John Smith has a customer identifier of "0777." Accordingly, the message body area 1412 includes the text "ProductID0099" and "CustomerID0777." Further, the message body area 1412 includes the text "CampaignID0044," indicating that the order is associated with an email campaign with an identifier of "0044."

Alternatively, or in addition to the message body area having the text "ProductID0099," "CustomerID0777," "Qty0001," and "CampaignID0044," which clearly refer to what is being selected and include proprietary information (such as customer ID), the message body area 1412 may include a UUID of the selected button or hyperlink. As shown, the UUID provides much more security, since it random and users cannot tamper with it as they could with the identifiable text information.

Referring again to FIG. 11, the email client module 122 may send the generated order email message to the e-commerce system 100 (step 1112). This may be performed in response to input from a user of the customer client device 120. As one example, the email client module 122 may, in response to a selection of the Send button 1202 in the message composition window 1200 of FIG. 12, transmit an order email message based on the contents of the fields 1202-1212 in the message composition window 1200.

As another example, the email client module 122 may, in response to a selection of the Send button 1402 in the message composition window 1400 of FIG. 14, transmit an order email message based on the contents of the fields 1404-1412 in the message composition window 1400.

Referring back to FIG. 11, the email interface module 112 and the message processing module 110 may then receive the order email message (step 1114). This may include, for example, the message processing module 110 periodically querying the email interface module 112 for information related to new messages received by the email interface module 112 for one or more of the email accounts used by the e-commerce system 100.

Further, the message processing module 110 may validate the contents of the order email message by determining if the message is formatted correctly and/or includes information that it should include. For example, the message processing module 110 may be configured to expect that the text of the body of the order email message should include information related to an order placed by a customer, such as an identifier of a customer that transmitted the message, a product identifier, an identifier that indicates a donation amount, an identifier of a vendor associated with the order, information that indicates a quantity associated with the order, a campaign identifier, and/or other information. In an instance where the message processing module 110 determines that the information included in the order email message is invalid (e.g., if one or more required pieces of information are missing and/or formatted incorrectly), the message processing module 110 may send one or more emails (not depicted) to the email address from which the order email message was received, indicating that the order email message could not be correctly processed.

Alternatively or additionally, the message processing module 110 may validate the contents of the order email message by determining whether it includes information that matches data stored in the e-commerce database 106. For example, the message processing module 110 may determine whether one or more identifiers, (such as a customer identifier, product identifier, vendor identifier, or campaign identifier), in the message corresponds to a valid identifier in the e-commerce database 106. In an instance where the message processing module 110 determines that the information included in the order email message is invalid (e.g., if one or more of the identifiers in the message are not valid identifiers), the message processing module 110 may send one or more emails (not depicted) to the email address from which the order email message was received, indicating that the order email message could not be correctly processed.

The message processing module 110 may then determine whether an order confirmation procedure should be performed (step 1116). This may be based on, for example, a parameter related to the vendor with which the order corresponding to the order email message is associated. For example, a vendor might configure the e-commerce system 100 such that all orders for that vendor do or do not require an order confirmation before the orders are processed. This information may be provided to the account management module 102 in the e-commerce system 100 via, for example, the web browser module 134 in the vendor client device 130. The account management module 102 may store this information in the e-commerce database 106. To perform this determination, the message processing module 110 may determine which vendor to which the order pertains, based on a product identifier and/or vendor identifier include in the order email message. The message processing module 110 may then access the e-commerce database 106 via the database module 104 to determine whether this vendor has indicated whether an order confirmation is required before the order is processed.

Alternatively or additionally, the message processing module 110 may determine whether an order confirmation procedure should be performed based on the nature of the order (step 1116). For example, the message processing module may be configured to determine that orders that do not require fulfillment of an order by a merchant, (for example, orders that relate only to a donation or other pure exchange of funds), do not require an order confirmation procedure, while orders that relate to relate to the fulfillment of an order for tangible goods do require an order confirmation procedure.

In an instance where the message processing module 110 determines that an order confirmation procedure is required, the message processing module 110, email interface module 112, and the email client module 122 may perform an order confirmation procedure (step 1118).

As one example, the order confirmation procedure (step 1118) may include the transmission of one or more confirmation email messages (not depicted) from the message processing module 110 to the email client module 122 that indicates that the order has been received. These confirmation email messages may be generated by the message processing module 110, and transmitted to the email client module 122 via the email interface module 112. One example of such a confirmation email message is shown in FIG. 15.

Figure 15:
FIG. 15 is a first order confirmation email message.

FIG. 15 shows an email display window 1500 that may be used by the email client module 122 to display the example confirmation email message received from the message processing module 110. The email display window 1500 includes a Reply button 1502, a control area 1504, and a message body area 1506. These display elements 1502, 1504, 1506 may possess similar and/or analogous characteristics and/or perform similar functionality as corresponding display elements 442, 444, 446 in the email display window 440 of FIG. 4.

Alternatively or additionally, during the order confirmation procedure (step 1118), the message processing module 110 (in conjunction with the email interface module 112) may exchange one or more email messages with the email client 122, in order to determine whether the order should be canceled, or whether the order should be executed. In such an instance, the message processing module 110 and/or the order execution module 108 may determine, based on the exchange email messages, whether the order should be executed.

Alternatively or additionally, the order confirmation procedure (step 1118) may be, or include, the any or any combination of the actions shown in FIG. 16, which is described in further detail below.

In an instance where the message processing module 110 and/or the order execution module 108 make a determination that the order should be executed, or in an instance where an order confirmation procedure is not performed, and/or in any other appropriate context, an order execution procedure may be performed, to complete the order indicated in the order email message (step 1120). The message processing module 110, the order execution module 108, the payment processing module 136, and/or the vendor order fulfillment system 138 may participate in the order execution procedure (step 1120).

The order execution procedure (step 1120) may include, for example, the order execution module 108 accessing credit card accounts and/or other financial information related to the customer that is stored in the e-commerce database 106 via the database module 104. This may also include the order execution module accessing bank account and/or other financial information related to the vendor that is stored in the e-commerce database 106 via the database module. The order execution module 108 may transmit the financial information related to both the customer and the vendor to the payment processing system 136, indicating that a payment should be made from the account of the customer to the account of the vendor.

Alternatively or additionally, an example order execution procedure (step 1120) may include one or more of the following actions: The order execution module 108 may access the order email message, which may include an identifier of the customer and a donation identifier/product identifier. Based on the donation identifier, the order execution module 108 may determine the non-profit organization to which the donation indicated in the order email message is intended.

Further, the order execution module 108 may determine, based on the donation identifier, the amount to be donated. The order execution module 108 may determine the non-profit organization to which the donation indicated in the order email message is intended and the amount to be donated by, for example, querying the e-commerce database 106 (via the database module 104). Further, the order execution module 108 may perform a query of the e-commerce database 106 (either directly or via the database module 104) to obtain financial information for the customer and the non-profit organization. The query to the e-commerce database 106 for the customer's financial information may include the identifier of the customer, and the response to the query may be the customer's financial information. Similarly, the query to the e-commerce database 106 may include the identifier of the vendor, and the response to the query may be the vendor's financial information The financial information for the customer may include, for example, credit card information (such as a credit card number and expiration date), and/or other information related to a bank account and/or other type of financial accounts (such as an e-Payment account). The financial information for the vendor may include information related to a bank account and/or other types of financial account (such as an e-Payment account) held by the vendor.

The order execution module 108 may transmit the financial information related to both the customer and the vendor to the payment processing system 136. As one example, the transmitted financial information may include an account number of the vendor and the credit card number and expiration date for a credit card account held by the customer, and the transmitted financial information may indicate that payment should be made to the to the identified account of the vendor from the credit card account of the customer for the amount indicated in the order email message.

Alternatively or additionally, the order execution procedure (step 1120) may include the order execution module 108 sending one or more messages to the vendor order fulfillment system 138 related to the order. For example, the order execution module 108 may send one or more messages to the vendor order fulfillment system 138 that indicate information such as the shipping address of the customer, an identifier of the items being ordered, a quantity of the items being ordered, and/or other information. Additionally, the vendor order fulfillment system 138 may communicate one or more messages to the order execution module 108 that indicate status updates with respect to fulfillment of the order. For example, the vendor order fulfillment system 138 may send one or more messages to the order execution module 108 that indicate milestones in the fulfillment of the order (e.g., that the goods involved in the order have shipped), and/or that fulfillment of the order is complete.

Alternatively or additionally, the order execution procedure (step 1120) may be or include any or any combination of the actions shown in FIG. 20, which is described in further detail below.

The message processing module 110 and/or the email interface module 112 may then generate an order conclusion email message (step 1122). The order conclusion email message may indicate, for example, that the order was successfully completed, whether an error occurred that prevented successful completion of the order, that the order was canceled, and/or other information. The email interface module 112 may then transmit the order conclusion email message to the email client 122 (step 1124) in the customer client device 120. The email client 122 may then receive and display the order conclusion email message (step 1126). The email client 122 may display the order conclusion email message in an email display window (not depicted), with similar and/or analogous characteristics to the email display window 1500 described above with reference to FIG. 15.

Figure 16:
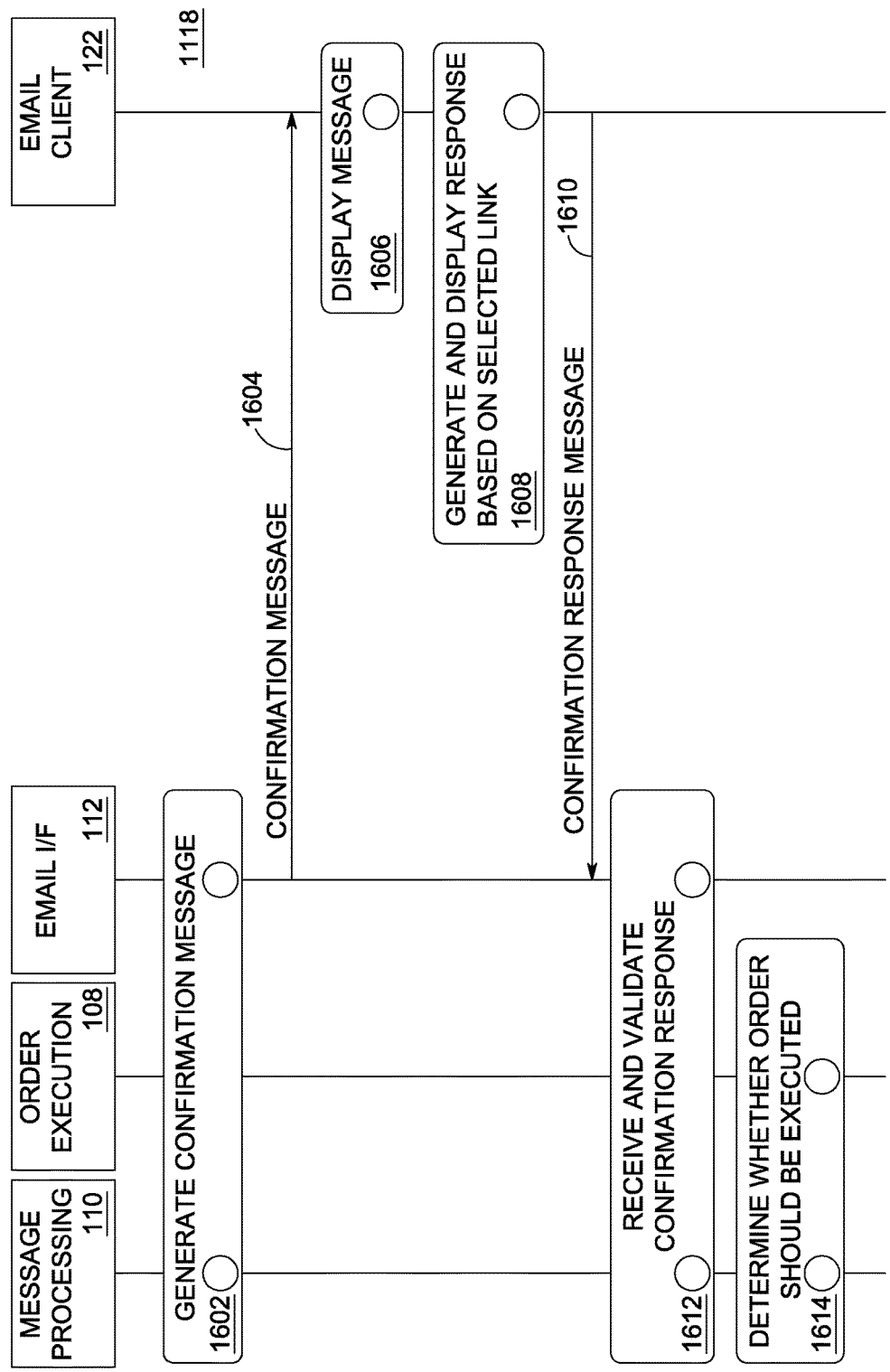
FIG. 16 is a flow diagram of an example order confirmation method.

FIG. 16 shows an example order confirmation method 1118 that may be utilized. FIG. 16 shows components of the e-commerce system 100, including the message processing module 110, the order execution module 108, and the email interface module 112. FIG. 16 also shows the email client module 122 of the customer client device 120.

The method of FIG. 16 may begin with the message processing module 110 and/or the email interface module 112 generating a confirmation email message (step 1602). The confirmation email message may include information that indicates that an order has been placed, and may invite the user of the email client module 122 to provide input as to whether the order should be completed or not. As will be described in further detail below, the confirmation email message may include one or more mailto hyperlinks that describe a confirmation response email message that indicates whether the order should be completed or not.

Generating the confirmation email message (step 1602) may also include determining the email address to which the confirmation email message should be sent. As described above with reference to FIG. 1, the e-commerce database 106 may store information that includes a customer identifier and an email address for each customer. According to a first approach for determining the email address to which the confirmation email message should be sent, the message processing module 110 may determine the customer identifier associated with the order that is being confirmed. The message processing module 110 may then obtain from the e-commerce database 106 (via the database module 104) the email address that is stored in the database that is associated with the customer identifier. The message processing module 110 may generate the confirmation email message such that it is addressed to the email address that is stored in the database that is associated with the customer identifier. According to this approach, it is possible that the email address from which the order email message was originally sent (as one example, as described above with respect to step 510 of FIG. 5) will be different from the address to which the confirmation email message is sent. According to a second approach, the message processing module 110 may generate the confirmation email message, such that it is addressed to the same email address from which the order email message was originally sent.

The email interface module 112 may transmit the confirmation email message to the email client module 122 (step 1604). The confirmation email message may be received by the email client module 122, and displayed by the email client module 122 (step 1606).

Figure 17:
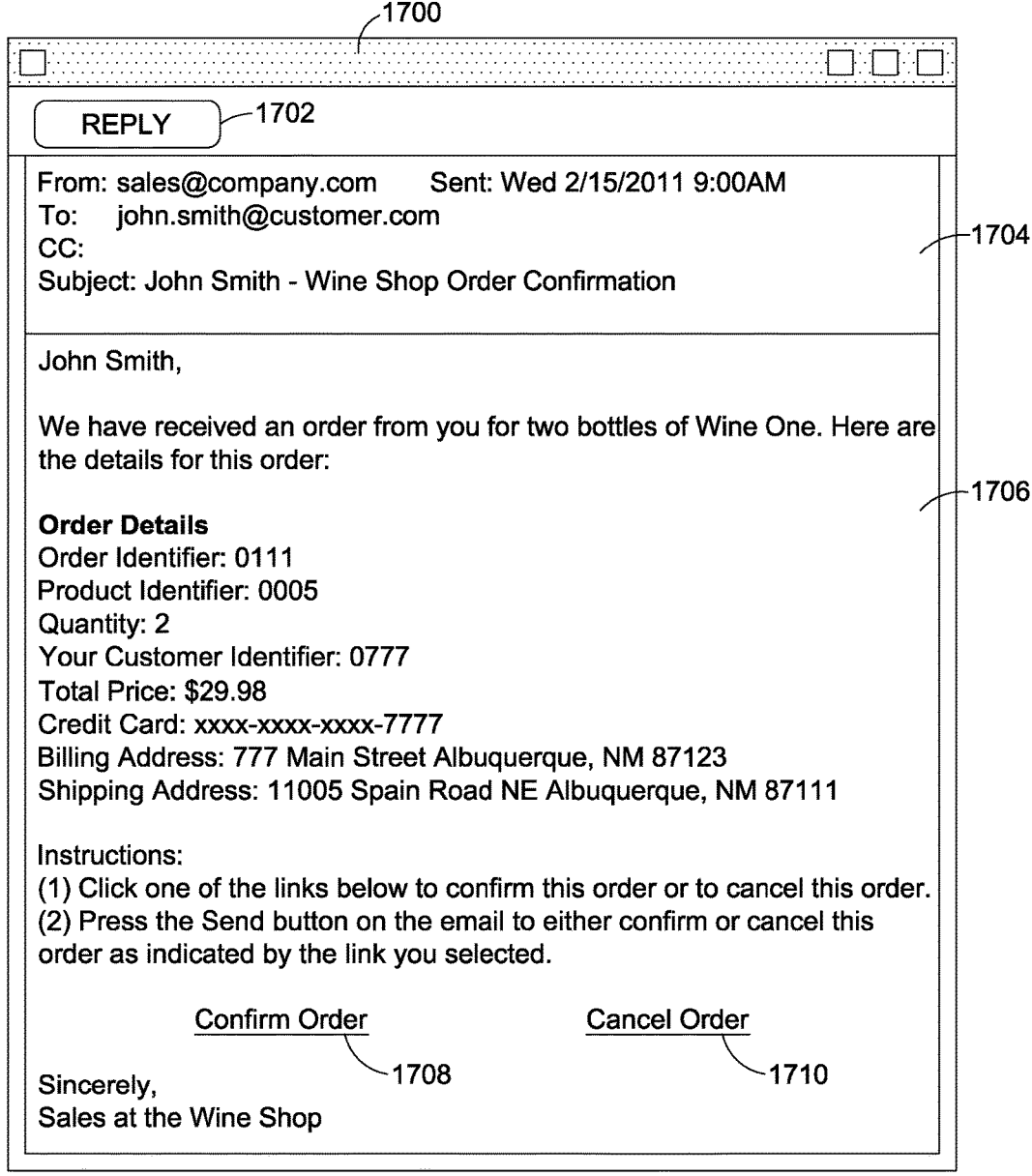
FIG. 17 is a second order confirmation email message.

Referring now to both FIG. 16 and FIG. 17, FIG. 17 shows an email display window 1700 that may be used by the email client module 122 to display an example confirmation email message (step 1606). The email display window 1700 includes a Reply button 1702, a control area 1704, and a message body area 1706. These display elements 1702, 1704, 1706 may possess similar and/or analogous characteristics and/or perform similar functionality as corresponding display elements 442, 444, 446 in the email display window 440 of FIG. 4. According to the example of FIG. 17, the control area 1704 shows that the sender of the message has the email address "sales@company.com." This is an email address that may be associated with an account used by the e-commerce system 100 for the communication of email messages. Further to this example, the control area 1704 shows that the email address of the recipient of the message (John Smith) is "john.smith@customer.com."

As shown in FIG. 17, the message body area 1706 may include information that describes the order that is being confirmed. The message body area 1706 also includes mailto hyperlinks, such as the "Confirm Order" hyperlink 1708 and "Cancel Order" hyperlink 1710. The "Confirm Order" hyperlink 1708 describes an email message that, if received by the e-commerce system 100, will indicate to the e-commerce system 100 that John Smith would like to proceed with the order indicated by the example confirmation email message. The "Cancel Order" hyperlink 1710 describes an email message that, if received by the e-commerce system 100, will indicate to the e-commerce system 100 that John Smith would like to cancel the order indicated by the example confirmation email message.

The email client module 122 may receive a user input that indicates that one of the hyperlinks displayed in the message body area 1706 is selected. The user input may be, for example, a mouse click, keyboard input, or any other type of input that indicates that a hyperlink is selected. Referring again to FIG. 16, the email client module 122 may, in response to this user input, generate and display a confirmation response email message as specified by the selected hyperlink (step 1608).

Figure 18:
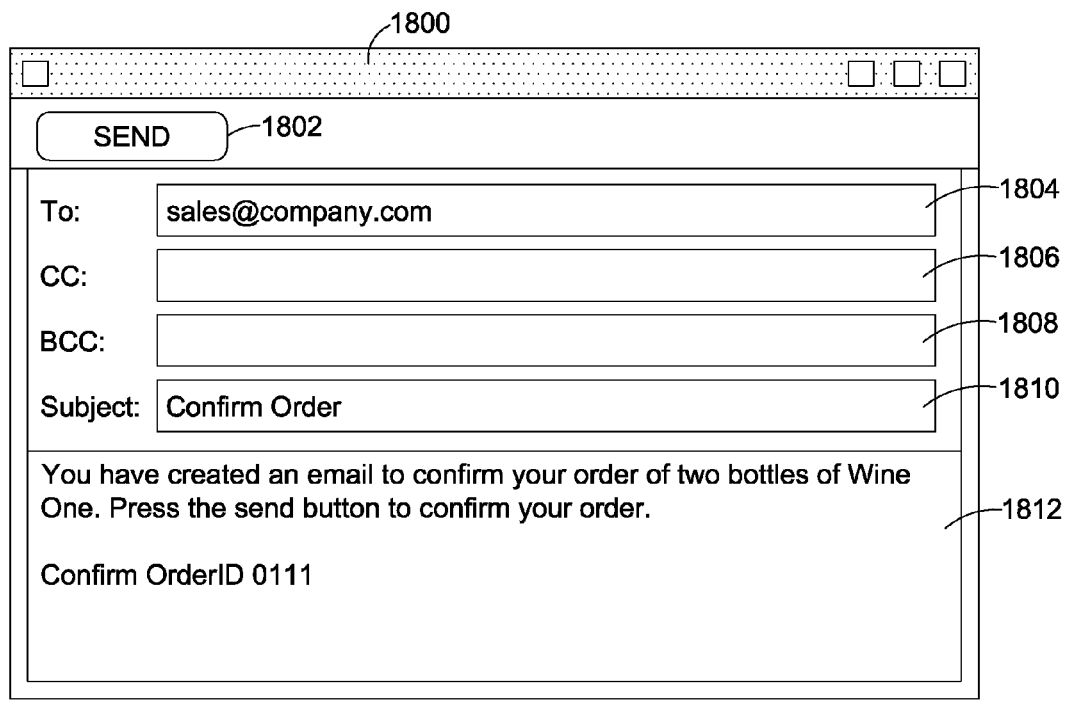
FIG. 18 is an email message that may be used to confirm an order.

Referring now to FIG. 16, FIG. 17, and FIG. 18, FIG. 18 shows an example message composition window 1800 that may be displayed in response to a selection of the "Confirm Order" hyperlink 1708 from the message body area 1706 of the email display window 1700 of FIG. 17 (step 1608). The message composition window 1800 of FIG. 18 may include a Send button 1802, a To area 1804, a CC area 1806, a BCC area 1808, a Subject area 1810, and a message body area 1812. These display elements 1802-1812 may possess similar and/or analogous characteristics and/or perform similar functionality as corresponding display elements 1202-1212 in the message composition window 1200 of FIG. 12.

Figure 19:
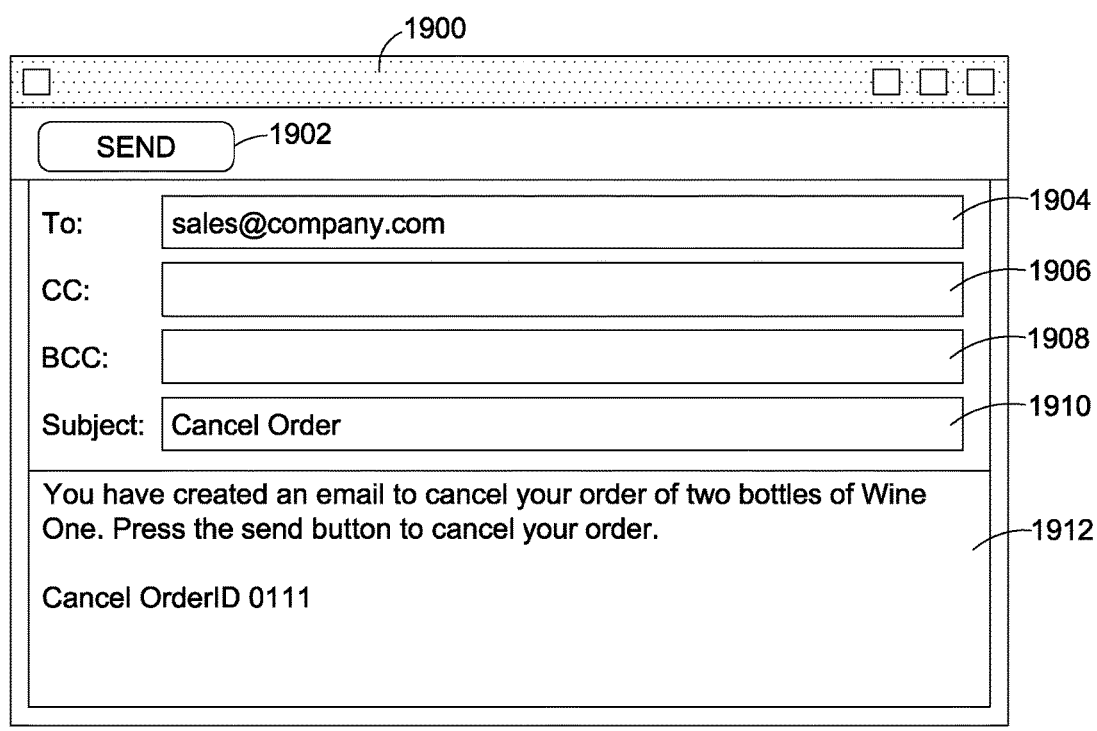
FIG. 19 is an email message that may be used to cancel an order.

Referring now to FIG. 16, FIG. 17, and FIG. 19, FIG. 19 shows an example message composition window 1140 that may be displayed in response to a selection of the "Cancel Order" hyperlink 1710 from the message body area 1706 of the email display window 1700 of FIG. 17 (step 1608). The message composition window of FIG. 19 may include a Send button 1902, a To area 1904, a CC area 1906, a BCC area 1908, a Subject area 1910, and a message body area 1912. These display elements 1902-1912 may possess similar and/or analogous characteristics and/or perform similar functionality as corresponding display elements 1202-1212 in the message composition window 1200 of FIG. 12.

Referring again to FIG. 16, the email client module 122 may send the generated confirmation response email message to the e-commerce system 100 (step 1610). This may be performed in response to input from a user of the customer client device 120. As one example of an order confirmation, the email client module 122 may, in response to a selection of the Send button 1802 in the message composition window 1800 of FIG. 18, transmit the email message to confirm the order based on the contents of the fields 1804-1812 in the message composition window 1800.

As another example, the email client module 122 may, in response to a selection of the Send button 1902 in the message composition window 1900 of FIG. 19, transmit the email message to cancel the order based on the contents of the fields 1904-1912 in the message composition window 1900.

The email interface module 112 and the message processing module 110 may then receive the confirmation response email message (step 1612). This may include, for example, the message processing module 110 periodically querying the email interface module 112 for information related to new messages received by the email interface module 112 for one or more of the email accounts used by the e-commerce system 100.

Further, the message processing module 110 may validate the contents of the confirmation response email message by determining if the message is formatted correctly and/or includes information that it should include. For example, the message processing module 110 may be configured to expect that the text of the confirmation response email message should include information that indicates an identifier of an order to which the confirmation response email message pertains.

Alternatively or additionally, the message processing module 110 may validate the contents of the order email message by determining whether it includes information that matches data stored in the e-commerce database 106. For example, the message processing module 110 may determine whether an order identifier in the confirmation response email message corresponds to a valid order identifier. In an instance where the message processing module 110 determines that the information included in the order email message is invalid (e.g., if an order identifier in the message is not a valid order identifier), the message processing module 110 may send one or more emails (not depicted) to the email address from which the confirmation response email message was received, indicating that the confirmation response email message could not be correctly processed.

The message processing module 110 and/or the order execution module 108 may then determine whether the order should be executed (step 1614). This may be based on, for example, the contents of the confirmation response email message. In an instance where the confirmation response email message indicates that the order should be canceled, the message processing module 110 and/or the order execution module 108 may determine that the order should be canceled. In an instance where the confirmation response email message indicates that the order should be executed, the message processing module 110 and/or the order execution module 108 may determine that the order should be executed.

Figure 20:
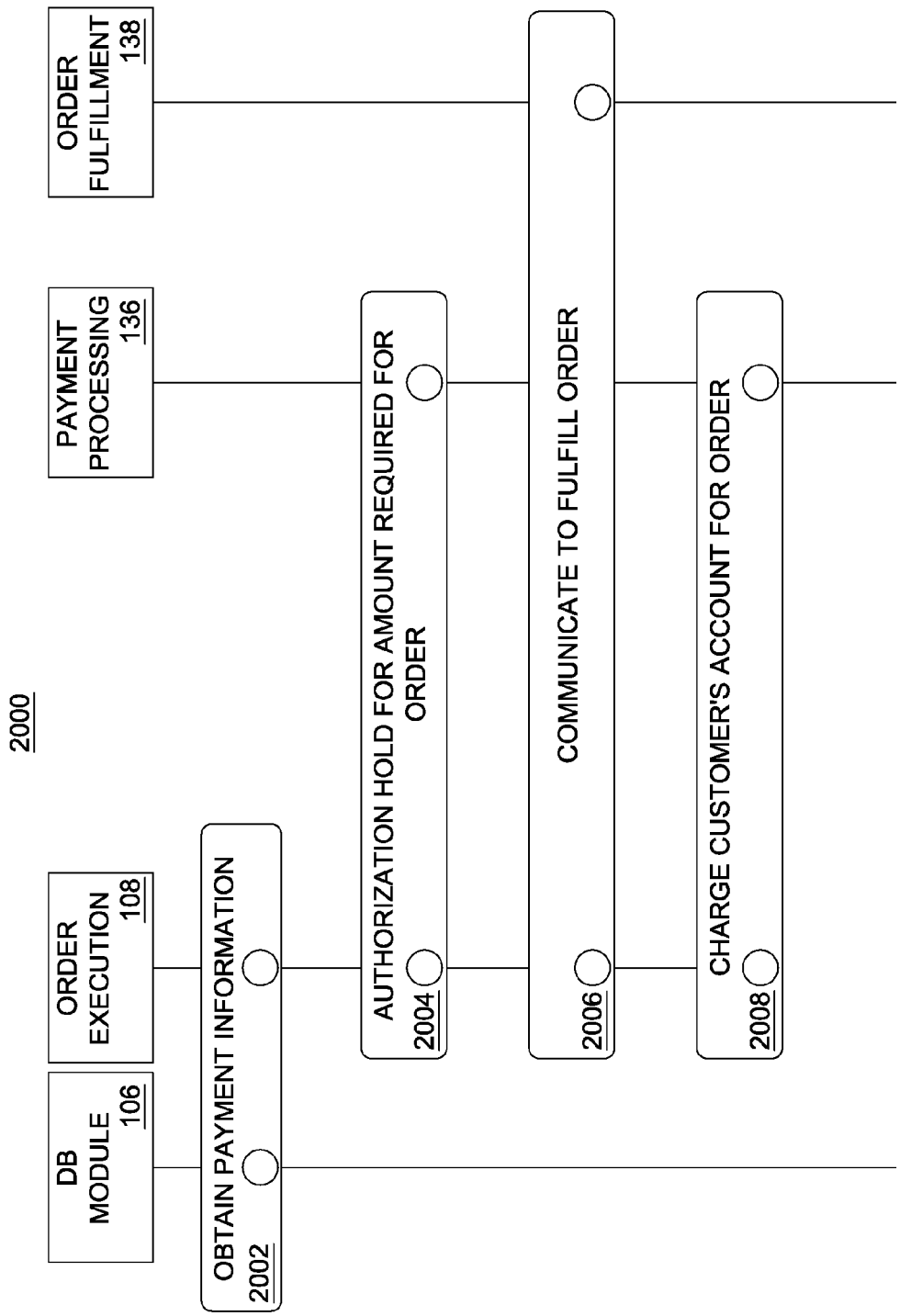
FIG. 20 is a flow diagram of an example order execution method.

FIG. 20 shows an example order execution method 2000 that may be utilized. FIG. 12 shows the order execution module 108 and the database module 106 of the e-commerce system 100, as well as the payment processing system 136 and the vendor order fulfillment system 138.

The method of FIG. 20 may begin with the order execution module 108 obtaining credit card information associated with the customer for whom the order will be executed (step 2002). This may include the obtaining the credit card information from the e-commerce database 106 via the database module 104. The credit card information may include a credit card number and an expiration date.

The order execution module 108 may then communicate with the payment processing module 136 to put a preauthorization hold on the customer's account for the amount required for the order (step 2004). This may include, for example, the order execution module 108 sending one or more messages to the payment processing system 136 that include the credit card information and the amount that should be held. This may also include the payment processing system 136 sending one or more messages to the order execution module 108 that indicate that the hold was successfully placed on the customer's account.

The order execution module 108 and the payment processing module 136 may then communicate to fulfill the order (step 2006). This may include, for example, the order execution module 108 sending one or more messages to the vendor order fulfillment system 138 that include information such as the shipping address of the customer, an identifier of the items being ordered, a quantity of the items being ordered, and/or other information. This may also include the vendor order fulfillment system 138 sending one or more messages to the order execution module 108 that indicate status updates with respect to fulfillment of the order. For example, the vendor order fulfillment system 138 may send one or more messages to the order execution module 108 that indicate progress with respect to the fulfillment of the order, and/or that fulfillment of the order is complete.

The order execution module 108 may then communicate with the payment processing system 136 to charge the customer's account for the amount associated with the order (step 2008). This may include the order execution module 108 sending one or more messages to the payment processing system that indicate that the customer's account should be charged for the amount associated with the order. This may also include the payment processing system 136 sending one or more messages to the order execution module 108 that indicate that the customer's account was successfully charged.

Charging the customer's account (step 2008) maybe performed in response to the order execution module 108 receiving information from the vendor order fulfillment system 138 that indicates that the order has been completed. Alternatively, the order execution module 108 may determine that, if a preconfigured amount of time (e.g., forty-eight hours) has passed since an order had been first communicated to the order fulfillment system 138 (step 2006) and no error or cancellation messages had been received by the order execution module 108 from the order fulfillment system 138, the order had been successfully fulfilled and that the customer's account should be charged. The order execution module 108 may then communicate (step 2008) with the payment processing system 136 to charge the customer's account in response to this determination. Alternatively or additionally, a vendor may communicate with the account management module 102 in the e-commerce system 100 to provide information via a web interface that indicates that an order has been fulfilled. In such an instance, the account management module 102 may store information in the e-commerce database 106 that indicates that the order has been fulfilled.

The order execution module 108 may periodically obtain data from the e-commerce database via the database module 104 that reflects whether the order has been fulfilled. If the order execution module 108 obtains information that indicates that the order has been fulfilled, the order execution module 108 may determine that the customer's account should be charged; the order execution module 108 may then communicate (step 2008) with the payment processing system 136 to charge the customer's account in response to this determination.

Figure 21:
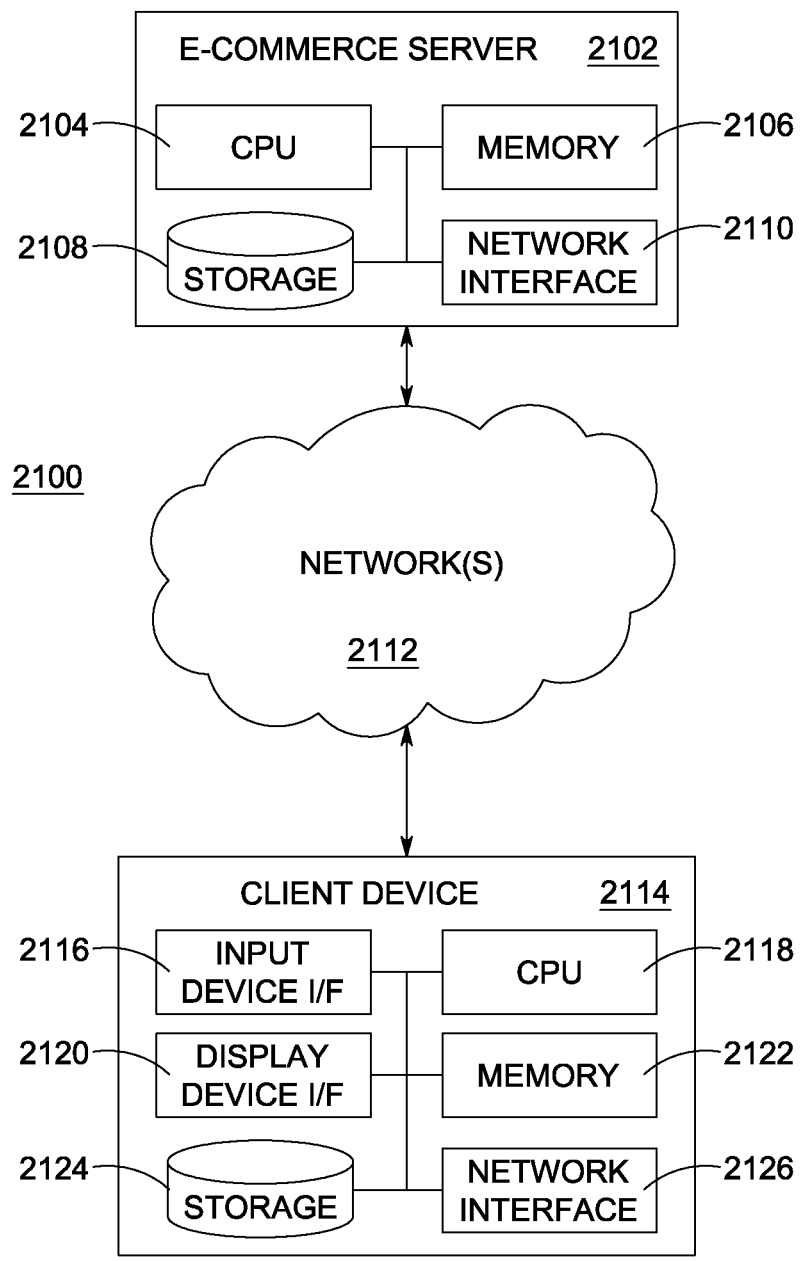
FIG. 21 is an example system that may be used to implement features described with reference to FIGS. 1-20.

FIG. 21 shows an example system 2100 that may be used to implement features described hereinbefore. The example system 2100 includes an e-commerce server 2102, a client device 2114, and one or more networks 2112.

The e-commerce server 2102 may include at least one processor 2104, memory device 2106, network interface 2110, and storage device 2108. The client device 2114 may include at least one processor 2118, memory device 2122, network interface 2126, input device interface 2116, display device interface 2120, and storage device 2124.

Figure 2:
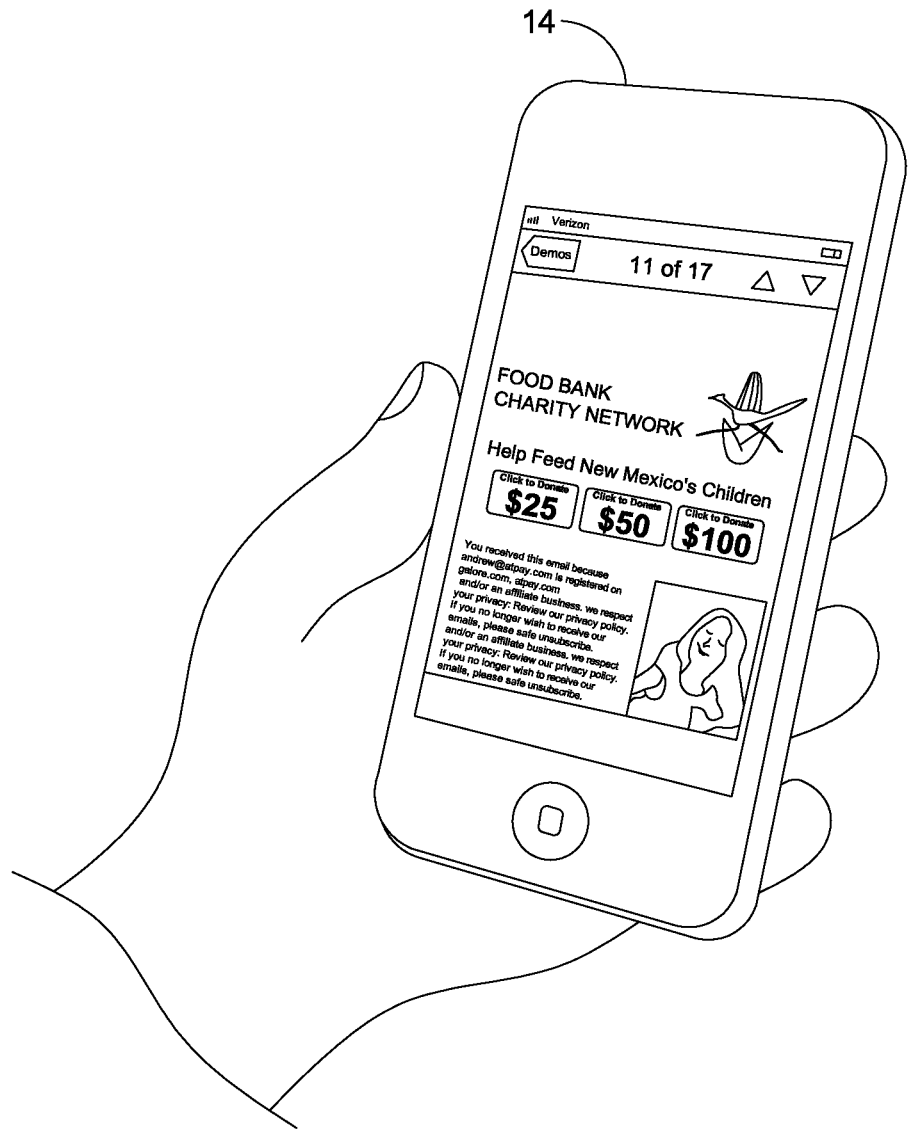
FIG. 2 shows the graphical user interface (GUI) on a customer client device as embodied as a smartphone.
Figure 3:
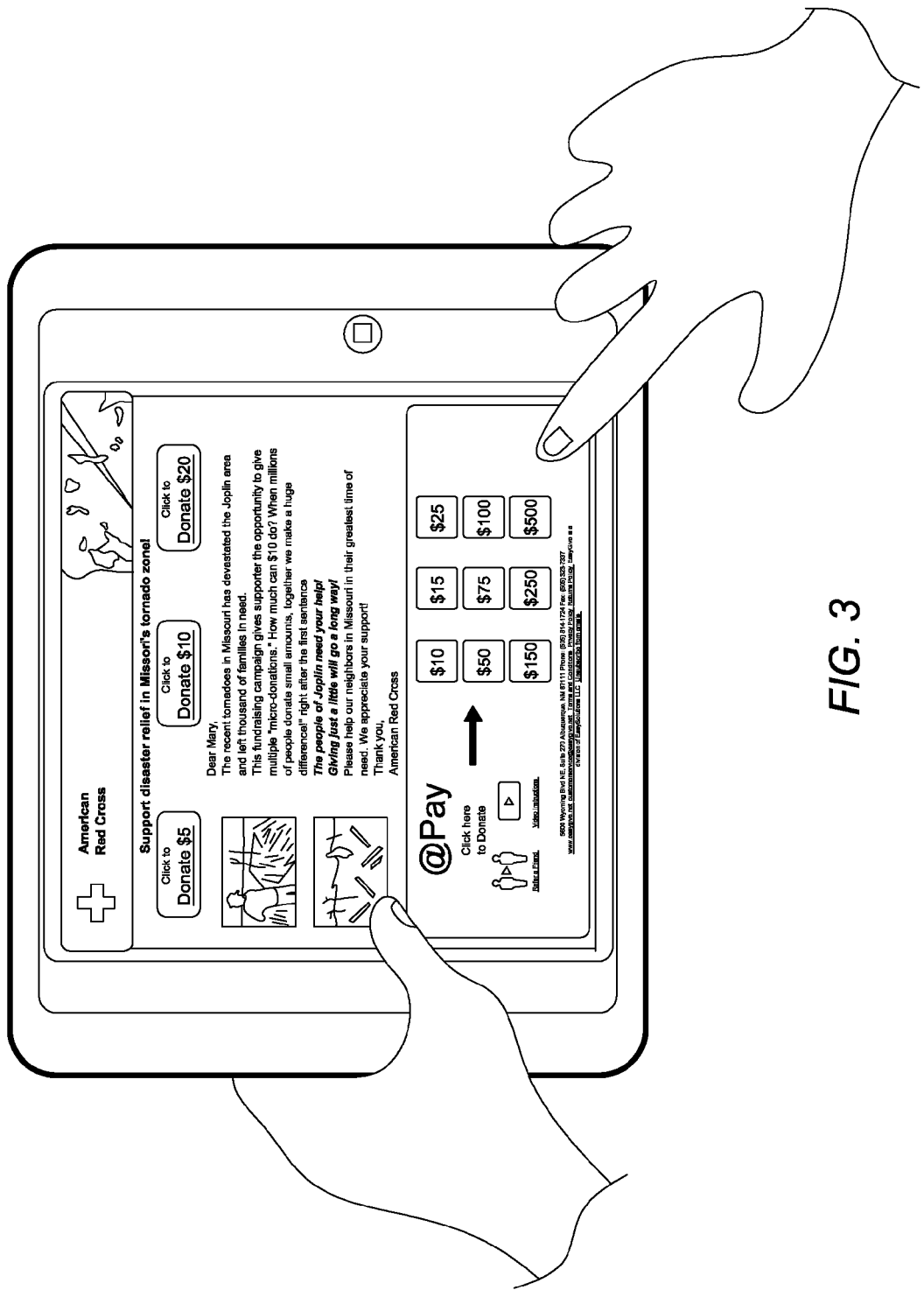
FIG. 3 shows a GUI on a customer client device as embodied on a tablet computer.

The e-commerce server 2102 may be configured to perform any feature or combination of features described hereinbefore as performed by the account management module 102, database module 104, order execution module 108, message processing module 110, and/or email interface module 112. The client device 2114 may be configured to perform any feature or combination of features described hereinbefore as performed by the email client module 122 and/or the web browser module in the customer client device 120. The client device 2114 may be, for example, a desktop computer, a laptop computer, a netbook, a smartphone (as shown in FIG. 2), a tablet computer (as shown in FIG. 3), a personal digital assistant (PDA), a cellular phone, or any other appropriate device.

Each or any of the memory devices 2106, 2122 may be or include a device such as a Dynamic Random Access Memory (D-RAM), Static RAM (S-RAM), or other RAM or a flash memory. Each or any of the storage devices 2108, 2124 may be or include a hard disk, a magneto-optical medium, an optical medium such as a CD-ROM, a digital versatile disk (DVDs), or Blu-Ray disc (BD), or other type of device for electronic data storage. The storage device 2108 in the e-commerce server 2102 may store the information or any subset of the information described hereinbefore as stored in the e-commerce database 106.

Each or any of the network interfaces 2110, 2126 may be, for example, a communications port, a wired transceiver, or a wireless transceiver. Each or any of the network interfaces 2110, 2126 may be capable of communicating using technologies such as Ethernet, fiber optics, microwave, xDSL (Digital Subscriber Line), Wireless Local Area Network (WLAN) technology, wireless cellular technology, and/or any other appropriate technology. The network interfaces 2110, 2126 may be used by the e-commerce server 2102 and/or the client device 2114 to communicate via the one or more networks 2112. The network interface 2110 in the e-commerce server 2102 may be configured to communicate any of the messages and/or other information described hereinbefore as communicated by the account management module 102, database module 104, order execution module 108, message processing module 110, and/or email interface module 112.

The network interface 2126 in the client device 2114 may be configured to communicate any of the messages and/or other information described hereinbefore as communicated by the email client module 122 and/or by the web browser module in the customer client device 120 used for communicating with the account management module 102.

The one or more networks 2112 may include one or more private networks and/or one or more public networks such as the Internet. The one or more networks 2112 may be based on wired and/or wireless networking technologies.

The input device interface 2116 in the client device 2114 may be an interface configured to receive input from an input device such as a keyboard, a mouse, a trackball, a scanner, a touch screen, a touch pad, a stylus pad, and/or other device. The input device interface 2116 may operate using a technology such as Universal Serial Bus (USB), PS/2, Bluetooth, infrared, and/or other appropriate technology. The input device interface 2116 may be configured to receive any or any combination of the user input described hereinbefore as received by the by the email client module 122 and/or by the web browser module 124 in the customer client device 120 used for communicating with the account management module 102.

The display device interface 2120 may be an interface configured to communicate data to a display device (not depicted). The display device interface 2120 may operate using technology such as Video Graphics Array (VGA), Super VGA (S-VGA), Digital Visual Interface (DVI), High-Definition Multimedia Interface (HDMI), or other appropriate technology. The client device 2114 may include or be connected to a display device (not depicted) via the display device interface 2120. The display device may be, for example, a monitor or television display, a plasma display, a liquid crystal display (LCD), and/or a display based on a technology such as front or rear projection, light emitting diodes (LEDs), organic light-emitting diodes (OLEDs), or Digital Light Processing (DLP). The display device may be configured to display, based on data received via the display device interface 2120, any display elements described hereinbefore as displayed by the email client module 122 and/or by the web browser module 124 in the customer client device 120.

The memory device 2106 and/or the storage device 2108 of the e-commerce server 2102 may store instructions which, when executed by the at least one processor 2104, cause the at least one processor 2104 to perform any feature or combination of features described hereinbefore as performed by the account management module 102, database module 104, order execution module 108, message processing module 110, and/or email interface module 112. The memory device 2122 and/or the storage device 2124 of the client device 2114 may store instructions which, when executed by the at least one processor 2118, cause the at least one processor 2118 to perform any feature or combination of features described hereinbefore as performed by the email client module 122 and/or by the web browser module 124 in the customer client device 120 used for communicating with the account management module 102.

Although FIG. 21 shows a single e-commerce server 2102 and a single client device 2114, the functionality described above with reference to FIG. 21 as performed by the e-commerce server 2102 and/or the client device 2114 may be distributed across any number of devices that possesses similar characteristics and/or that include similar components 2104, 2106, 2108, 2110, 2118, 2120, 2122, 2124, 2128 as the e-commerce server 2102 and/or the client device 2114.

While examples are provided above hereinbefore which includes the use of email communications, those features may also be implemented using different types of communications technology. For example, the features described hereinbefore may also be implemented, mutatis mutandis, using technologies that include any one or any combination of: email; instant messaging; enterprise messaging; Short Message Service (SMS); Multimedia Messaging Service (MMS); and/or any other appropriate technology for the electronic communication of data.

As use herein, the term "vendor" broadly refers to and is not limited to a business, a non-profit organization, any other type of organization, and/or an individual person. One example of a business is an online retailer. Examples of non-profit organizations include charitable organizations, educational institutions such as schools and universities, arts organizations, and recreational organizations. Examples of recreational organizations include historical or preservation societies, local recreational sports leagues.

As used herein, the term "processor" broadly refers to and is not limited to a single- or multi-core general purpose processor, a special purpose processor, a conventional processor, a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

As used to herein, the term "computer-readable storage medium" broadly refers to and is not limited to a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVDs, or BD, or other type of device for electronic data storage.

Although features and elements are described above in particular combinations, each feature or element can be used alone or in any combination with or without the other features and elements. For example, each feature or element as described hereinbefore may be used alone without the other features and elements or in various combinations with or without other features and elements. Sub-elements of the methods and features described hereinbefore may be performed in any arbitrary order (including concurrently), in any combination or sub-combination.

What is claimed is:

1. A system for facilitating payments from a customer client device to a vendor client device, comprising a payment gateway and a network interface:
   the electronic payment gateway comprising:
   a memory storing a database of information that includes at least:
   an identifier of a customer;
   an email address of the customer; and
   an identifier of a product offered by a vendor;
   a processor configured to generate a first Simple Mail Transfer Protocol (SMTP) email message, the first SMTP email message being addressed to the email address of the customer and includes a visible SMTP mailto link associated with the at least one product, wherein the visible mailto link includes non visible information including an email address of the system, a unique identifier associated with the product, and the identifier of the customer; wherein the visible mailto link is configured to, upon selection by a customer on a customer client device, generate a second SMTP email message, that is addressed to the email address of the system and includes the identifier of the customer and the unique identifier associated with the product; and
   a network interface configured:
   to transmit the first advertising SMTP email message from the e-commerce system to a customer client device; and
   to receive the second SMTP email message from the customer client device;
   wherein the second SMTP email message indicates an order by the customer for the product, is responsive to the customer selecting the visible mailto link using the customer client device, is addressed to the email address of the e-commerce system, and includes the identifier of the customer and the unique identifier the product; and
   the processor and the network interface are further configured to perform an order execution procedure based on the received second SMTP email message, wherein the order execution procedure includes purchasing the product for the customer from the vendor client device.

2. The e-commerce system of claim 1, wherein the network interface is further configured to perform the order execution procedure by transmitting one or more messages to a payment processing system.

3. The e-commerce system of claim 2, wherein:
   the database is further configured to store credit card information of the customer; and
   the payment processing system is a payment gateway that is operated by a financial institution.

4. The e-commerce system of claim 1, wherein the network interface is further configured to perform the order execution procedure by communicating with an order fulfillment system.

5. The e-commerce system of claim 1, wherein:
   the processor is further configured to determine, in response to the second SMTP email message, whether an order confirmation procedure should be performed; and
   the processor and the network interface are further configured to perform the order confirmation procedure in response to a determination that the order confirmation procedure should be performed.

6. The e-commerce system of claim 5, wherein the at least one processor is further configured to determine whether the order confirmation procedure should be performed based on one or more of: the identifier of the customer; the identifier of the product; or an identifier of the vendor.

7. The e-commerce system of claim 5, wherein:
the processor is further configured to generate a confirmation SMTP email message,
wherein the confirmation SMTP email message requests the customer to confirm the second SMTP email message,
wherein the confirmation SMTP email message is addressed to the email address of the customer, and
wherein the confirmation email message includes a second mailto link which includes the email address of the e-commerce system; and an order identifier associated with the second SMTP email message;
the network interface is further configured:
to transmit the confirmation SMTP email message; and
to receive a confirmation response SMTP email message,
wherein the confirmation response SMTP email message is responsive to the confirmation email message, is addressed to the email address of the e-commerce system, and includes the order identifier and information that indicates whether the order is confirmed or canceled; and
the processor is further configured to determine whether the order execution procedure should be performed based on whether the order is confirmed or canceled.

8. An electronic commerce (e-commerce) system for communicating with a customer client device and a vendor client device, comprising:
an electronic payment gateway comprising:
a memory for hosting a database configured to store information that includes at least:
an identifier of a customer;
an email address of the customer; and
an identifier of a vendor;
a processor configured to generate a first Simple Mail Transfer Protocol (SMTP) email message, the first SMTP email message including a payment amount,
wherein the first SMTP email message is addressed to the email address of the customer, and includes a visible SMTP mailto link associated with the payment amount, wherein the visible mailto link includes:
non visible information including at least one field that includes an email address of the e-commerce system, a unique identifier associated with the payment amount; and the identifier of the customer; wherein the visible mailto link is configured to, upon selection by a customer on a customer client device, generate a second SMTP email message that is addressed to the email address of the e-commerce system and includes the identifier of the customer and the unique identifier of the payment amount; and
a network interface configured:
to transmit the first SMTP email message from the e-commerce system to a customer client device; and
to receive the second SMTP email message from the customer client device;
wherein the second SMTP email message comprises a confirmation by the customer to pay the payment amount, is responsive to the customer selecting the visible mailto link using the customer client device, and is addressed to the email address of the e-commerce system, and
wherein the second SMTP email message includes the identifier of the customer and the unique identifier the payment amount; and
wherein the processor and the network interface are further configured to transmit the payment amount from the customer to the vendor based on the received second SMTP email message.

9. The e-commerce system of claim 8, wherein:
the database is further configured to store credit card information of the customer; and transmission of the payment amount from the customer to the vendor comprises debiting the customer's credit card.

10. The e-commerce system of claim 8, wherein:
the processor is further configured to determine, in response to the second SMTP email message, whether transmission of the payment should be performed; and
the processor and the network interface are further configured to execute a confirmation procedure in response to a determination that the transmission of the payment should be performed.

11. The e-commerce system of claim 10, wherein:
the processor is further configured to generate a confirmation SMTP email message,
wherein the confirmation SMTP email message includes a solicitation for the customer to confirm the second SMTP email message, is addressed to the email address of the customer, and includes a second mailto link, wherein the second mailto link includes:
a second destination address field that indicates the email address of the e-commerce system; and
a second field that indicates a payment identifier associated with the second SMTP email message;
the network interface is further configured:
to transmit the confirmation SMTP email message; and
to receive a confirmation response SMTP email message,
wherein the confirmation response SMTP email message is responsive to the confirmation email message,
wherein the confirmation response SMTP email message is addressed to the email address of the e-commerce system, and
wherein the confirmation response SMTP email message includes the payment identifier and information that indicates whether the payment is confirmed or canceled; and
the processor is further configured to determine whether the payment execution procedure should be performed based on the information that indicates whether the payment is confirmed or canceled.

12. An electronic commerce (e-commerce) system for communicating with a customer client device and a vendor client device, comprising:
an electronic payment gateway comprising:
a memory for hosting a database configured to store information that includes at least:
an identifier of a customer;
an email address of the customer; and
an identifier of a vendor;
a processor configured to generate a first Simple Mail Transfer Protocol (SMTP) email message, the first SMTP email message including at least one payment amount,
wherein the first SMTP email message is addressed to the email address of the customer, and wherein the first SMTP email message includes a visible SMTP mailto link associated with the payment amount, wherein the visible mailto link includes:
   non visible information including an email address of the e-commerce system, a unique identifier associated with the payment amount, the identifier of the customer and the identifier of the vendor; wherein the visible mailto link is configured to, upon selection by a customer on a customer client device, generate a second SMTP email message that is addressed to the email address of the e-commerce system and includes the unique identifier associated with the payment amount, the identifier of the customer, and the identifier of the vendor; and
a network interface configured:
   to transmit the first SMTP email message from the e-commerce system to a customer client device; and
   to receive the second SMTP email message from the customer client device;
      wherein the second SMTP email message is responsive to the customer selecting the visible mailto link using the customer client device, is addressed to the email address of the e-commerce system, and indicates the desire of the customer to pay the payment amount; the second SMTP email message including the identifier of the customer and the unique identifier of the payment amount; and
   wherein the processor and the network interface are further configured to transmit the payment amount based on the received second SMTP email message.

13. The e-commerce system of claim 12, wherein transmitting the payment amount comprises the network interface is further configured to transferring funds from the customer to the vendor.

14. The e-commerce system of claim 13, wherein:
the database is further configured to store credit card information of the customer; and transferring funds from the customer to the vendor includes debiting the credit card of the customer.

15. The e-commerce system of claim 12, wherein:
the processor is further configured to perform a payment confirmation procedure.

16. The e-commerce system of claim 15, wherein:
the payment confirmation procedures includes transmission of a payment confirmation SMTP email message which requests that the customer confirm the payment indicated in the second SMTP email message,
   wherein the payment confirmation SMTP email message is addressed to the email address of the customer and includes a second mailto link including:
      a second destination address that indicates the email address of the e-commerce system; and a payment identifier associated with the second SMTP email message;
the network interface is further configured:
   to transmit the payment confirmation SMTP email message; and
   to receive a payment confirmation response SMTP email message,
      wherein the payment confirmation response SMTP email message is responsive to the confirmation SMTP email message,
      wherein the payment confirmation response SMTP email message is addressed to the email address of the e-commerce system, and
      wherein the payment confirmation response SMTP email message includes the order identifier and information that indicates whether the order is confirmed or canceled; and
the processor is further configured to determine whether the order execution procedure should be performed based on the information that indicates whether the order is confirmed or canceled.

17. An system for communicating with a customer client device and a vendor client device, comprising:
a memory for storing information that includes at least:
   an identifier of a customer;
   an email address of the customer; and
   an identifier of a vendor;
a processor configured to generate a first Simple Mail Transfer Protocol (SMTP) email message, the first SMTP email message setting forth at least one payment amount, is addressed to the email address of the customer, and includes a visible SMTP mailto link associated with the at least one payment amount, wherein the visible mailto link includes:
   non visible information including an email address of the e-commerce system, a unique identifier associated with the payment amount, the identifier of the customer and the identifier of the vendor; wherein the visible mailto link is configured to, upon selection by a customer on a customer client device, generate a second SMTP email message, that is addressed to the email address of the system and includes the identifier of the customer, the unique identifier associated with the payment, and the identification of the vendor; and
a network interface configured to transmit the first SMTP email message from the system to a customer client device; and to receive the second SMTP email message from the customer client device;
   wherein the second SMTP email message confirms an order by the customer for the payment, is responsive to the customer selecting the visible mailto link using the customer client device, and is addressed to the email address of the e-commerce system, and includes the identifier of the customer, the unique identifier the payment, and the identification of the vendor; and
wherein the processor and the network interface are further configured to perform execution of the payment based on the second SMTP email message, wherein execution of the payment includes transferring funds from the customer to the vendor.

18. The e-commerce system of claim 17, wherein:
the database is further configured to store credit card information of the customer; and transferring funds from the customer to the vendor includes debiting the credit card of the customer.

19. The e-commerce system of claim 17, wherein:
the processor is further configured to perform a payment confirmation procedure.

* * * * *